(12) United States Patent
Long et al.

(10) Patent No.: US 10,049,170 B1
(45) Date of Patent: Aug. 14, 2018

(54) METHODS AND SYSTEMS FOR SELECTIVELY PREVENTING THIRD-PARTY CONTENT FROM BEING DISPLAYED USING UNDEFINED PUBLISHER IDENTIFIER

(71) Applicant: Google Inc., Mountain View, CA (US)

(72) Inventors: Thomas James Worthington Long, London (GB); Pieter Albertus Mathijs Senster, London (GB)

(73) Assignee: Google LLC, Mountain View, CA (US)

( * ) Notice: Subject to any disclaimer, the term of this patent is extended or adjusted under 35 U.S.C. 154(b) by 158 days.

(21) Appl. No.: 14/468,887

(22) Filed: Aug. 26, 2014

(51) Int. Cl.
| | |
|---|---|
| *H04W 28/00* | (2009.01) |
| *H04W 40/00* | (2009.01) |
| *H04W 48/00* | (2009.01) |
| *H04L 12/00* | (2006.01) |
| *H04N 21/00* | (2011.01) |
| *H04N 21/80* | (2011.01) |
| *G06F 17/30* | (2006.01) |
| *G06F 17/21* | (2006.01) |
| *G06F 17/24* | (2006.01) |

(Continued)

(52) U.S. Cl.
CPC ...... *G06F 17/30905* (2013.01); *G06F 17/212* (2013.01); *G06F 17/24* (2013.01); *G06F 17/30896* (2013.01); *H04L 67/02* (2013.01); *G06F 17/20* (2013.01); *G06F 17/30* (2013.01)

(58) Field of Classification Search
CPC .. G06F 17/30905; G06F 17/212; G06F 17/24; G06F 17/30896; H04L 67/02
USPC ......................................................... 715/235
See application file for complete search history.

(56) References Cited

U.S. PATENT DOCUMENTS

| | | | | |
|---|---|---|---|---|
| 2001/0011251 | A1* | 8/2001 | Sugahara | H04H 60/16 705/51 |
| 2008/0300974 | A1* | 12/2008 | Bhandari | G06Q 30/02 705/14.46 |

(Continued)

OTHER PUBLICATIONS

About Adblock Plus, 2 pgs, searched via online https://adblockplus.org/en/about on Aug. 25, 2014.

(Continued)

*Primary Examiner* — Cesar B Paula
*Assistant Examiner* — Luu-Phuong T Nguyen
(74) *Attorney, Agent, or Firm* — Foley & Lardner LLP

(57) ABSTRACT

Systems and methods of selectively preventing content slots from displaying content items on an information resource are described. Processors receive a request to provide, to a computing device, an electronic document corresponding to an information resource having content slots in which content items are displayed. The processors determine, in response to the request, to provide a modified version of the electronic document including actionable language that prevents at least one of the content slots from displaying content items. The processors identify in the electronic document, the at least one content slot to prevent from displaying content items. The processors modify the electronic document to include a snippet of actionable language in a portion of the electronic document that is executed by the computing device prior to executing actionable language corresponding to the identified at least one content slot. The processors transmit the modified electronic document to the computing device.

18 Claims, 9 Drawing Sheets

(51) Int. Cl.
  *H04L 29/08*    (2006.01)
  *G06F 17/20*    (2006.01)

(56) References Cited

U.S. PATENT DOCUMENTS

| | | | | |
|---|---|---|---|---|
| 2009/0187486 A1* | 7/2009 | Lefenfeld | ............... | G06Q 30/02 705/14.73 |
| 2009/0307095 A1* | 12/2009 | Chatani | .................. | G06Q 30/02 705/14.73 |
| 2011/0173126 A1* | 7/2011 | Knapp | ............... | G06Q 20/3829 705/71 |
| 2011/0283010 A1* | 11/2011 | Parchman | ........ | H04N 21/23608 709/231 |
| 2013/0311301 A1* | 11/2013 | Grant | ................ | G06Q 30/0273 705/14.69 |
| 2014/0229275 A1* | 8/2014 | Bjorndahl | .......... | G06Q 30/0251 705/14.49 |
| 2014/0278992 A1* | 9/2014 | Roundtree | ......... | G06Q 30/0257 705/14.55 |
| 2015/0019350 A1* | 1/2015 | Grant | ................. | G06Q 30/0275 705/14.71 |
| 2015/0170072 A1* | 6/2015 | Grant | ................... | G06Q 10/067 705/7.36 |
| 2015/0206177 A1* | 7/2015 | Yao | .................... | G06Q 30/0246 705/14.45 |
| 2015/0339734 A1* | 11/2015 | Wilson | ............... | G06F 21/6263 705/14.73 |

OTHER PUBLICATIONS

Ad serving was disabled to your website, 5 pgs, searched via online at https://support.google.com/adsense/answer/113061?hl=en , on Aug. 25, 2014.
Use ad exclusions to block ads, 4 pgs, searched via online at https://support.google.com/dfp_premium/answer/2627086?hl=en , on Aug. 25, 2014.

* cited by examiner

METHODS AND SYSTEMS FOR SELECTIVELY PREVENTING THIRD-PARTY CONTENT FROM BEING DISPLAYED USING UNDEFINED PUBLISHER IDENTIFIER

BACKGROUND

Information resources, such as web pages, can include primary content and content slots that serve as placeholders for third-party content items, such as creatives. When the web page is rendered on a user computing device, third-party content items are inserted in the content slots and provided for display alongside the primary content. The content slots in which third-party content items are inserted are typically defined manually in the web page code.

SUMMARY

At least one aspect is directed to a method of generating a stable identifier for nodes likely to include primary content of an information resource. A processor identifies, on an information resource, a plurality of content-related Document Object Model (DOM) nodes based on a primary content detection policy including one or more rules. The processor determines one or more container nodes containing one or more of the identified content-related DOM nodes. The processor generates, for each of the container nodes, one or more identifiers corresponding to the container node. The processor then determines, for each of the generated identifiers, one or more container nodes to which the identifier corresponds. The processor identifies, from the generated identifiers, a subset of the generated identifiers that correspond only to container nodes that contain the content-related DOM nodes and selects one of the identifiers of the subset as a stable identifier.

In some implementations, the processor determines, for a content-related DOM node of the plurality of content-related DOM nodes, a container node of the container nodes that is nearest to the content-related DOM node contained by the container node. In some implementations, the processor determines the container node nearest to the content-related DOM node by identifying one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name. In some implementations, the stable class name includes any class name that does not end in a number.

In some implementations, selecting one of the identifiers of the subset as the stable identifier includes identifying an identifier of the subset including only a tag name. In some implementations, selecting one of the identifiers of the subset as the stable identifier includes determining, for each identifier of the subset, a content identification score indicating an ability of the identifier to identify primary content on the information resource based on a number of contents of the container nodes to which the identifier of the subset is associated and selecting, based on the content identification scores of the identifiers of the subset, one of the identifiers of the subset as the stable identifier.

In some implementations, determining the content identification score of each identifier of the subset includes determining a first number of characters in paragraphs included within the container nodes associated with the identifier of the subset and a second number of characters included within the container nodes associated with the identifier of the subset. In some implementations, determining the content identification score of each identifier of the subset includes determining a first number of paragraphs included within the container nodes associated with the identifier of the subset and a second number of paragraphs included within the information resource. In some implementations, determining the content identification score of each identifier of the subset includes determining a first number of characters in paragraphs included within the container nodes associated with the identifier of the subset and a second number of characters included within all paragraphs included within the information resource.

In some implementations, the processor stores the identity of the stable identifier with the information resource. In some implementations, the processor inserts a creative in between adjacent container nodes corresponding to the stable identifier responsive to receiving a request to serve the information resource.

In some implementations, the processor can determine, from the generated identifiers, a subset of the generated identifiers corresponding only to container nodes that contain the content-related DOM nodes and selects one of the identifiers of the subset as a stable identifier.

According to another aspect, a system for generating a stable identifier for nodes likely to include primary content of an information resource includes a data processing system configured to identify, on an information resource, a plurality of content-related Document Object Model (DOM) nodes based on a primary content detection policy including one or more rules, determine one or more container nodes container nodes containing one or more of the identified content-related DOM nodes, generate, for each of the container nodes, one or more identifiers corresponding to the container node, determine, for each of the generated identifiers, one or more container nodes to which the identifier corresponds, identify, from the generated identifiers, a subset of the generated identifiers that correspond only to container nodes that contain the content-related DOM nodes and select one of the identifiers of the subset as a stable identifier.

In some implementations, the processor determines, for a content-related DOM node of the plurality of content-related DOM nodes, a container node of the container nodes that is nearest to the content-related DOM node contained by the container node. In some implementations, the processor determines the container node nearest to the content-related DOM node by identifying one or more container nodes that either i) start with a title, or ii) the node is a member of a cascading style sheet (CSS) class that indicates that the node is a post; and the node either i) has a tag name that includes ARTICLE, or ii) the node has a tag name that includes DIV, INS or TD and the node has at least one stable class name. In some implementations, the stable class name includes any class name that does not end in a number.

In some implementations, selecting one of the identifiers of the subset as a stable identifier includes identifying an identifier of the identifier of the subset including only a tag name. In some implementations, selecting one of the identifiers of the subset as the stable identifier includes determining, for each identifier of the subset, a content identification score indicating an ability of the identifier to identify primary content on the information resource based on a number of contents of the container nodes to which the identifier of the subset is associated and selecting, based on the content identification scores of the identifiers of the subset, one of the identifiers of the subset as the stable identifier.

In some implementations, determining the content identification score of each identifier of the subset includes determining a first number of characters in paragraphs included within the container nodes associated with the identifier of the subset and a second number of characters included within the container nodes associated with the identifier of the subset. In some implementations, determining the content identification score of each identifier of the subset includes determining a first number of paragraphs included within the container nodes associated with the identifier of the subset and a second number of paragraphs included within the information resource. In some implementations, determining the content identification score of each identifier of the subset includes determining a first number of characters in paragraphs included within the container nodes associated with the identifier of the subset and a second number of characters included within all paragraphs included within the information resource.

In some implementations, the processor stores the identity of the stable identifier with the information resource. In some implementations, the processor inserts a creative in between adjacent container nodes corresponding to the stable identifier responsive to receiving a request to serve the information resource.

In some implementations, the processor can determine, from the generated identifiers, a subset of the generated identifiers corresponding only to container nodes that contain the content-related DOM nodes and selects one of the identifiers of the subset as a stable identifier.

According to another aspect, a computer-readable storage medium has computer-executable instructions, which when executed by a computer, cause the computer to identify, on an information resource, a plurality of content-related Document Object Model (DOM) nodes based on a primary content detection policy including one or more rules, determine one or more container nodes container nodes containing one or more of the identified content-related DOM nodes, generate, for each of the container nodes, one or more identifiers corresponding to the container node, determine, for each of the generated identifiers, one or more container nodes to which the identifier corresponds, identify, from the generated identifiers, a subset of the generated identifiers that correspond only to container nodes that contain the content-related DOM nodes and select one of the identifiers of the subset as a stable identifier.

According to another aspect, a method of selectively preventing content slots from displaying content items on an information resource. One or more processors can receive a request to provide, to a computing device, an electronic document including actionable language and primary content corresponding to an information resource having one or more content slots in which third-party content items are displayed when the information resource is displayed at the computing device. The processors can determine, in response to the request, to provide a modified version of the electronic document corresponding to the information resource. The modified version includes actionable language that prevents at least one of the content slots from displaying third-party content items. The processors can identify, responsive to determining to provide the modified version, in the electronic document, the at least one content slot to prevent from displaying third-party content items. The processors can modify the electronic document to include a snippet of actionable language in a portion of the electronic document that is executed by the computing device prior to executing actionable language corresponding to the identified at least one content slot. The processors can then transmit the modified electronic document to the computing device.

In some implementations, the snippet of actionable language is configured to override one or more properties of an object corresponding to the identified content slot. In some implementations, the snippet of actionable language is configured to replace a value of a property of the object identifying the content publisher to a content distribution server that selects content items to provide to the content slots of the information resource.

In some implementations, modifying the electronic document to include a snippet of actionable language in a portion of the electronic document includes inserting the snippet of actionable language at a location in a header portion of the electronic document.

In some implementations, identifying the at least one content slot to prevent from displaying third-party content items includes identifying, by inspecting a DOM tree of the electronic document, at least one DOM element corresponding to the at least one content slot. In some implementations, identifying the at least one content slot to prevent from displaying third-party content items includes identifying, by inspecting a DOM tree of the information resource, one or more DOM elements corresponding to the one or more content slots, identifying, for each of the identified DOM elements, an identifier associated with the DOM element and determining that the identifier matches an identifier identified in a list of identifiers of content slots selected to be prevented from displaying third-party content items. In some implementations, the list of identifiers of content slots selected to be prevented from displaying third-party content items is generated based on a policy for identifying content items based on one or more of a total number of content slots, a position of the content slots, or a type of content slot.

In some implementations, the request is a first request, the computing device is a first computing device, the modified version of the electronic document is a first modified version of the electronic document, and the snippet of actionable language is a first snippet. The processors can receive a second request to provide, to a second computing device, the electronic document. The processors can determine, in response to the second request, to provide a second modified version of the electronic document corresponding to the information resource. The second modified version includes actionable language that prevents at least one content slot different from the at least one content slot of the first modified version from displaying third-party content items. The processors identify, responsive to determining to provide the second modified version, in the electronic document, the at least one content slot of the second modified version to prevent from displaying third-party content items. The processors modify the electronic document to include a second snippet of actionable language in a portion of the electronic document that is executed by the computing device prior to executing actionable language corresponding to the identified at least one content slot of the second modified version of the electronic document. The processors transmit the second modified electronic document to the second computing device.

According to another aspect, a system for selectively preventing content slots from displaying content items on an information resource includes a data processing system having one or more processors. The processors can receive a request to provide, to a computing device, an electronic document including actionable language and primary content corresponding to an information resource having one or more content slots in which third-party content items are displayed when the information resource is displayed at the computing device. The processors can determine, in response to the request, to provide a modified version of the electronic document corresponding to the information resource. The modified version includes actionable language that prevents at least one of the content slots from displaying third-party content items. The processors can identify, responsive to determining to provide the modified version, in the electronic document, the at least one content slot to prevent from displaying third-party content items. The processors can modify the electronic document to include a snippet of actionable language in a portion of the electronic document that is executed by the computing device prior to executing actionable language corresponding to the identified at least one content slot. The processors can then transmit the modified electronic document to the computing device.

According to another aspect, a computer-readable storage medium has computer-executable instructions, which when executed by a computer, cause the computer to receive a request to provide, to a computing device, an electronic document including actionable language and primary content corresponding to an information resource having one or more content slots in which third-party content items are displayed when the information resource is displayed at the computing device, determine, in response to the request, to provide a modified version of the electronic document corresponding to the information resource, the modified version including actionable language that prevents at least one of the content slots from displaying third-party content items, identify, responsive to determining to provide the modified version, in the electronic document, the at least one content slot to prevent from displaying third-party content items, modify the electronic document to include a snippet of actionable language in a portion of the electronic document that is executed by the computing device prior to executing actionable language corresponding to the identified at least one content slot and then transmit the modified electronic document to the computing device.

The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
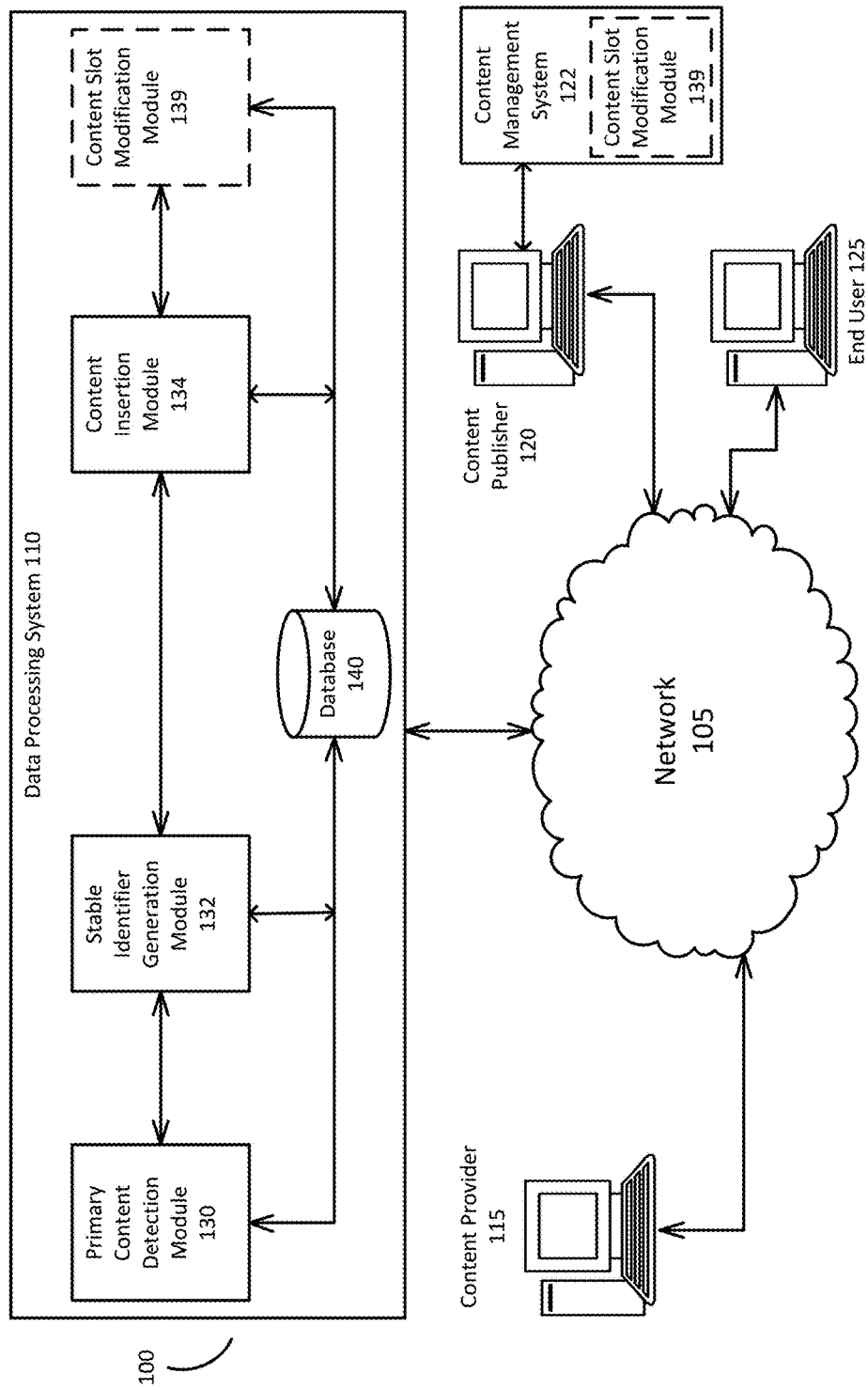
FIG. 1 is a block diagram depicting one implementation of an environment for automatically generating a stable identifier for primary content detected within an information resource and automatically identifying styles of properties of Document Object Model (DOM) elements of the information resource, according to an illustrative implementation.

Following below are more detailed descriptions of various concepts related to, and implementations of, methods, apparatus, and systems for automatically generating a stable identifier for primary content detected within an information resource, automatically identifying styles of properties of Document Object Model (DOM) elements of the information resource, modifying an information resource to selectively prevent content slots from displaying content items on the information resource and displaying the information resource modified to selectively prevent content slots from displaying content items on the information resource. The various concepts introduced above and discussed in greater detail below may be implemented in any of numerous ways, as the described concepts are not limited to any particular manner of implementation. Examples of specific implementations and applications are provided primarily for illustrative purposes.

One aspect of the present disclosure relates to generate a stable identifier for primary content detected within an information resource. By detecting primary content, such as posts or articles, within an information resource, a data processing system can generate a stable identifier for the detected primary content. The stable identifier can be used to reference primary content on future renderings of the information resource. For example, once the data processing system generates a stable identifier for the primary content included in the information resource, the data processing system can dynamically insert creatives in the information resource when the information resource is rendered at a computing device. Details relating to generating a stable identifier for primary content detected within an information resource are provided below with respect to Section A.

Another aspect of the present disclosure relates to selectively preventing content slots from displaying content items on an information resource. A data processing system including one or more processors can receive a request to provide, to a computing device, an electronic document including actionable language and primary content corresponding to an information resource having one or more content slots in which third-party content items are displayed when the information resource is displayed at the computing device. The processors can determine, in response to the request, to provide a modified version of the electronic document corresponding to the information resource. The modified version includes actionable language that prevents at least one of the content slots from displaying third-party content items. The processors can identify, responsive to determining to provide the modified version, in the electronic document, the at least one content slot to prevent from displaying third-party content items. The processors can modify the electronic document to include a snippet of actionable language in a portion of the electronic document that is executed by the computing device prior to executing actionable language corresponding to the identified at least one content slot. The processors can then transmit the modified electronic document to the computing device. Details relating to selectively preventing content slots from displaying content items on an information resource are provided below with respect to Section B.

In some implementations, the snippet of actionable language is configured to override one or more properties of an object corresponding to the identified content slot. In some implementations, the snippet of actionable language is configured to replace a value of a property of the object identifying the content publisher to a content distribution server that selects content items to provide to the content slots of the information resource.

A. Generating a Stable Identifier for Primary Content Detected within an Information Resource Information resources are often very complicated. For example, many information resources include numerous images and distinct sections of text. The information resources can include menus, headers, sidebars, footers, ads, widgets as well as what might be considered the actual primary content. Although a user viewing the information resource can easily differentiate these different parts of the information resource and focus on the primary content, the process of automatically detecting primary content included in an information resource is much more challenging.

Primary content on information resources, such as web pages, can often be presented in one of two forms. In one form, the primary content can be presented as a list of posts. Each post is its own distinct piece of content about a certain subject, but together the posts make up the primary content of the web page. Conversely, in another form, the primary content can be presented as a single long form post or article.

Once the primary content on an information resource is identified, the primary content may generally be contained in a container associated with a stable identifier. The present disclosure provides methods and systems for automatically generating stable identifiers for the detected primary content of an information resource. The generated stable identifiers can be used to insert content slots for serving creatives or third-party content items on the information resource.

The present disclosure provides methods and systems for automatically detecting these pieces of primary content. With respect to the first form in which the content is presented as a list of posts, each of the posts may be identified as a distinct piece of content. Conversely, with respect to the second form in which the content is presented as a single post or article, the whole of the primary content should be detected as a single piece of content.

In addition to detecting the primary content, the present disclosure provides methods and systems for generating a stable identifier for the detected primary content. For example, each of the posts that together form the primary content, can be wrapped in an <ARTICLE class='post'> tag in the HTML source, so a stable identifier might be {tagName: 'ARTICLE', className: 'post'}. Using the second form in which the content is presented as a single post or article as another example, the post or article can be wrapped in a <DIV class='story-body'> tag in the HTML source, so a stable identifier might be {tagName: 'DIV', className: 'story-body'}.

These identifiers allow the posts or articles on a web page to be very quickly and efficiently accessed by JAVASCRIPT once the page has been rendered in a browser. This allows for creatives to be inserted within the primary content of a page dynamically. In one example, a creative can be inserted after the first paragraph of each post when the web page is presenting the primary content as a list of posts. In another example, a creative can be inserted after the first three paragraphs of an article when the web page is presenting the primary content as a single piece of content.

The present disclosure relates to methods and systems for generating stable identifiers for content sections of an information resource. A processor can be configured to identify, on an information resource, a plurality of content-related Document Object Model (DOM) nodes likely to include primary content based on an identifier associated with the nodes, determine one or more container nodes containing one or more of the identified content-related DOM nodes, generate, for each of the container nodes, one or more identifiers corresponding to the container node, determine, from the generated identifiers, one or more potential identifiers corresponding only to container nodes that contain the content-related DOM nodes and select one of the potential identifiers as a stable identifier.

FIG. 1 illustrates an system 100 for generating a stable identifier for primary content detected within an information resource via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for instance with at least one content provider computing device 115, at least one content publisher computing device 120, or at least one end user computing device 125.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one primary content detection module 130, at least one stable identifier generation module 132, at least one content insertion module 134, at least one content slot modification module 139 and at least one database 140. The primary content detection module 130, the stable identifier generation module 132, the content insertion module 134 and the content slot modification module 139 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The primary content detection module 130, the stable identifier generation module 132, the content insertion module 134 and the content slot modification module 139 can include or execute at least one computer program or at least one script. The primary content detection module 130, the stable identifier generation module 132, the content insertion module 134 and the content slot modification module 139 can be separate components, a single component, or part of the data processing system 110. The primary content detection module 130, the stable identifier generation module 132, the content insertion module 134 and the content slot modification module 139 can include combinations of software and hardware, such as one or more processors configured to execute one or more scripts to identify, on an information resource, a plurality of content-related Document Object Model (DOM) nodes likely to include primary content, determine one or more container nodes container nodes containing one or more of the identified content-related DOM nodes, generate, for each of the container nodes, one or more identifiers corresponding to the container node, determine, from the generated identifiers, one or more potential identifiers corresponding only to container nodes that contain the content-related DOM nodes and select one of the potential identifiers as a stable identifier, for instance.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The content provider computing devices 115, the content publisher computing device 120 and the end user computing devices 125 may be any number of different user electronic devices, for example, a laptop computer, a desktop computer, a tablet computer, a smartphone, a digital video recorder, a set-top box for a television, a video game console, or any other computing device configured to communicate via the network 105. The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JAVASCRIPT, Perl, Python and Visual Basic.

The content provider computing devices 115, the content publisher computing device 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or advertiser can communicate with the data processing system 110 via the content provider computing device 115. In some implementations, the advertiser can communicate with the data processing system 110 via a user interface displayed on the user interface devices of the content provider computing device 115.

The primary content detection module 130 can be part of, or can include scripts executed by, one or more servers in the data processing system 110. In some implementations, the primary content detection module 130 can be designed, constructed or configured to identify, on an information resource, a plurality of content-related Document Object Model (DOM) nodes likely to include primary content. Examples of primary content can include posts, articles, or other content items that the web publisher has provided. Examples of content that may not be considered primary content can include advertisements, widgets, or links not related to the primary content. In some implementations, the primary content detection module 130 can be configured to identify all of the content-related Document Object Model (DOM) nodes included in the information resource. In some implementations, the primary content detection module 130 can identify content-related DOM nodes by inspecting the DOM tree of the information resource. The primary content detection module 130 can identify each node included within the information resource and determine whether the identified node is a content-related DOM node.

In some implementations, the primary content detection module 130 can determine that a DOM node is a content-related DOM node based on a primary content detection policy including one or more rules. In some implementations, the primary content detection module 130 can determine that a node is a content-related DOM node if the node is one or more of an effective text node, not an effective link node, contains more than a predetermined number of characters, no ancestor of the node is a paragraph, and either the node's rendered height is greater than or equal to twice the height of a line of text of the paragraph or the previous effective text node in the DOM tree is a title. In some implementations, the primary content detection module 130 can determine that a node is a content-related DOM node if the node contains content corresponding to a post or article, or any other content that the publisher of the information resource considers to be primary content. In some implementations, a node can be defined as an effective text node if the node is a text node containing visible text. In some implementations, a node can be defined as an effective text node if all of the children of the node are inline nodes and at least one of the node's children is an effective text node. In some implementations, a node can be defined as an effective link node if the node is an effective text node that is the descendent of an anchor tag, such as an A tag. In some implementations, the node can be defined as an effective link node if the node has at least one child and all of the node's children are effective links. In some implementations, a node can be defined as a title if the node is an effective text node and the node, or a descendent of the node is a header tag, such as an H1, H2, H3, H4, H5, or H6 tag. In some implementations, a node may be deemed to start with a title if the node is a title. In some implementations, the node may be deemed to start with a title if the node is not a paragraph and a title is encountered before a paragraph is encountered when traversing the node's subtree.

The primary content detection module 130 can be configured to determine, for each content-related DOM node, one or more container nodes containing one or more of the identified content-related DOM nodes. In some implementations, a node of the DOM tree may be identified as a container node if the node meets two criteria. The first criteria is that either the node has a tag type of ARTICLE or the node has a tag type of DIV, INS or TD and the node has at least one stable class name. In some implementations, a class name may be considered stable if the class name does not end in a number. In some implementations, a class name is considered to be stable if it does not match the following regular expression: /^.*[09]+$/. The second criteria is that the node either starts with a title or the node is a member of a Cascading Style Sheet (CSS) class that indicates that that the node is a post. Examples of CSS class types that indicate that the node is a post can include 'post' or 'typepost.'

In some implementations, the primary content detection module 130 can determine, for each of the identified content-related DOM nodes, the container node nearest to the content-related DOM node. In some implementations, the container node nearest to a given content-related DOM node can be the container node that contains the content-related DOM node and no other container nodes that also contain the content-related DOM node. In some implementations, the container node nearest to a given content-related DOM node can be the container node that contains the content-related DOM node and no other container nodes. In some implementations, the primary content detection module 130 can store a record of each identified content-related DOM node and the identity of the nearest container node that contained the identified content-related DOM node.

In some implementations, the primary content detection module 130 can determine any equivalent container node for each container node determined to contain one or more of the identified content-related DOM nodes. In some implementations, a node can be considered to be an equivalent container ancestor node if exactly one of the node's descendants is a container node, the DOM node contains exactly the same set of effective text nodes as the descendent container node and the node meets the two criteria for determining that a node is a container node.

In some implementations, the primary content detection module 130 can maintain a list of container nodes. The primary content detection module 130 can include each of the container nodes determined for each of the content-related DOM nodes in the list. In some implementations, the primary content detection module 130 can also include each of the equivalent container ancestor nodes determined for each container node. In some implementations, the primary content detection module 130 can remove any duplicate nodes from the list such that the list of container nodes includes each of the determined container nodes and any equivalent container ancestor nodes corresponding to the determined container nodes.

The stable identifier generation module 132 can be part of, or can include scripts executed by, one or more servers in the data processing system 110. In some implementations, the stable identifier generation module 132 can be designed, constructed or configured to generate, for each of the container nodes included in the list of container nodes, one or more identifiers corresponding to the container node. In some implementations, the stable identifier generation module 132 can be configured to generate, for each of the container nodes included in the list, every identifier corresponding to the container node.

In some implementations, the stable identifier generation module 132 can generate an identifier based on the type of tag associated with the container node for which the stable identifier generation module 132 is generating the identifier. In some implementations, the stable identifier generation module 132 can generate an identifier based on the class name associated with the container node. In some implementations, the stable identifier generation module 132 can generate the identifier according to an identifier generation policy that includes one or more rules. In some implementations, to generate an identifier for a given container node, the stable identifier generation module 132 identifies the type of tag associated with the container node and a class name associated with the tag. In some implementations, the stable identifier generation module 132 can generate an identifier having only a tag name if the container node corresponds to an ARTICLE tag type. In some implementations, the tag name of the identifier can be ARTICLE. In some implementations, the stable identifier generation module 132 can generate an identifier having a tag name and an ID if the ID is stable. A stable ID can be any ID that does not end in a number In some implementations, the stable identifier generation module 132 can generate an identifier having a tag name and a class name if the container node corresponds to any tag type other than ARTICLE. In some implementations, the identifier can include the tag type and a single stable class name. In some implementations, the stable class name can correspond to a class name that does not end with a number.

In some implementations, the stable identifier generation module 132 can be configured to maintain a list of identifiers generated for the container nodes included in the list of container nodes. In some implementations, the stable identifier generation module 132 may remove any duplicates in the list of identifiers generated for the container nodes.

In some implementations, the stable identifier generation module 132 can be configured to sort the identifiers generated for the container nodes based on a preference policy. In some implementations, the preference policy can include one or more rules for sorting the potential identifiers. Generally, a good identifier generated by the stable identifier generation module 132 should be stable, should reliably identify all container nodes on the information resource that contain the nodes likely to include primary content and should not identify any other nodes included in the information resource. In some implementations, the stable identifier generation module 132 can be configured to compare the identifiers included in the list to sort the identifiers in order of preference.

In some implementations, to execute or implement the preference policy, the stable identifier generation module 132 can compare two or more first determine whether any of the two identifiers includes only a tag name. Identifiers with only a tag name are preferred over identifiers having a tag name and an ID or identifiers having a tag name and a class name. As such, if one of the identifiers has only a tag name, that identifier will be ranked higher than the identifier not having only a tag name. If the stable identifier generation module 132 identifies that none of the identifiers includes only a tag name, the stable identifier generation module 132 determines whether any of the two identifiers includes a tag name and an ID. Identifiers having a tag name and an ID are preferred over identifiers having a tag name without an ID.

As such, if one of the identifiers has a tag name and an ID, that identifier will be ranked higher than the identifier not having an ID. If the stable identifier generation module 132 identifies that none of the identifiers includes a tag name and an ID, the stable identifier generation module 132 determines whether any of the two identifiers includes a tag name and a class name. Identifiers having a tag name and a class name are preferred over identifiers having a tag name without a class name. As such, if one of the identifiers has a tag name and a class name, that identifier will be ranked higher than the identifier not having a class name. If the stable identifier generation module 132 identifies that both of the identifiers includes a tag name and a class name, the stable identifier generation module 132 determines which of the identifiers has a more preferred class name. Identifiers having a more preferred class name are preferred over identifiers having a less preferred class name. As such, if one of the identifiers has a tag name and a more preferred class name, that identifier will be ranked higher than the identifier not having the more preferred class name. In some implementations, the class name 'post-container' is more preferred than the class names 'post' and 'type-post' and the class name 'post' is more preferred than the class name 'type-post.' If the stable identifier generation module 132 identifies that none of the identifiers includes a tag name with a preferred class name, the stable identifier generation module 132 determines that the identifier with the longer class name is preferred over an identifier with a shorter class name. As such, the identifier having a longer class name will be ranked higher than the identifier having a shorter class name. For example, an identifier having a tag name DIV and class name 'post' is preferred over an identifier having a tag type DIV and a class name 'another-class-name' since the class name 'post' is a preferred class name. In another example, an identifier having a tag name DIV and class name 'another-class-name' is preferred over an identifier having a tag type DIV and a class name 'class-name' since the class name 'another-class-name' is longer than the class name 'class-name.'

The stable identifier generation module 132 can be configured to associate each of the identifiers generated by the stable identifier generation module 132 to the container nodes determined by the primary content detection module 130. In some implementations, the stable identifier generation module 132 can construct a map that maps each generated identifier to all of the container nodes from which the stable identifier generation module 132 was able to generate the identifier. In some implementations, the identifiers can serve as keys in the constructed map.

In some implementations, the stable identifier generation module 132 can be configured to determine, for each of the generated identifiers, one or more container nodes to which the identifier corresponds. In some implementations, the stable identifier generation module 132 can be configured to perform, for each identifier, a lookup in the DOM tree of the information resource to identify all nodes that are referenced by the identifier. For each of the identified nodes corresponding to the identifier, the stable identifier generation module 132 can determine that the identified node is either in the list of container nodes maintained by the primary content detection module 130 or that the node meets the criteria for being identified as a container node. In response to determining that the identified node is not on the list of container nodes or does not meet the criteria for being identified as a container node, the stable identifier generation module 132 can disregard the identifier as a stable identifier and remove the identifier from the list of identifiers. Conversely, in response to determining that the identified node is either on the list of container nodes or meets the criteria for being identified as a container node, the stable identifier generation module 132 can determine a content identification content identification score for the identifier. The content identification score can indicate how well the identifier identifies posts, articles or other primary content on the information resource. In some implementations, the content identification score can indicate an ability of the identifier to identify primary content.

In some implementations, the stable identifier generation module 132 can be configured to determine the content identification score based on a number of contents of the container nodes to which the identifier is associated. In some implementations, the stable identifier generation module 132 can determine the content identification score of each identifier based on a first number of characters in nodes likely to include primary content that are contained the container nodes associated with the identifier and a second number of characters included within the container nodes associated with the identifier. In some implementations, the stable identifier generation module 132 can determine the content identification score of each identifier based on a first number of nodes likely to include primary content that are contained in the container nodes associated with the identifier and a second number of paragraphs included within the information resource. In some implementations, the stable identifier generation module 132 can determine the content identification score of each identifier based on a first number of characters in nodes likely to include primary content that are contained in the container nodes associated with the identifier and a second number of characters included within all nodes likely to include primary content that are included within the information resource.

In some implementations, the stable identifier generation module 132 can be configured to determine the content identification score based on the following formula:

$$S = \frac{C_{PARA}}{C_{TOTAL}} + K_1 \frac{P_{CONTAINED}}{P_{TOTAL}} + K_2 \frac{D_{CONTAINED}}{D_{TOTAL}}$$

where:
$C_{PARA}$ is the number of characters in nodes likely to include primary content that are contained in container nodes associated with the potential identifier;
$C_{TOTAL}$ is the total number of characters in container nodes associated with the potential identifier;
$P_{CONTAINED}$ is the number of nodes likely to include primary content that are contained in container nodes associated with the potential identifier;
$P_{TOTAL}$ is the total number of nodes likely to include primary content on the information resource;
$D_{CONTAINED}$ is the number of characters contained in nodes likely to include primary content that are contained in container nodes associated with the potential identifier;
$D_{TOTAL}$ is the number of characters contained in all nodes likely to include primary content on the information resource;
$K_1$ is a tunable parameter (for example, 0.5); and
$K_2$ is a tunable parameter (for example, 1).

The stable identifier generation module 132 can be configured to identify the identifier having the largest content identification score. The stable identifier generation module 132 can then select the identifier from the plurality of generated identifiers as the stable identifier for identifying container nodes that contain nodes that are likely to include primary content.

In some implementations, the stable identifier generation module 132 can be configured to store the identified potential identifier with the information resource. In some implementations, the identified potential identifier can be associated with each of the container nodes including primary content. In this way, when the information resource is accessed for rendering at a later time, the identifiers identifying the container nodes including the primary content can be used to easily identify the container nodes including the primary content. In some implementations, creatives can be inserted near the nodes likely to include primary content, thereby improving conversion rates of the creatives.

The content insertion module 134 can be part of, or can include scripts executed by, one or more servers in the data processing system 110. In some implementations, the content insertion module 134 can be designed, constructed or configured to insert a creative between adjacent container nodes that contain nodes likely to include primary content. In some implementations, the content insertion module 134 can identify the container nodes using the stable identifier selected by the stable identifier generation module 132. In some implementations, the content insertion module 134 can request access to the information resource, identify the generated stable identifier and identify the container nodes associated with the generated stable identifier. The content insertion module 134 can then insert creatives adjacent to or near these container nodes. As creatives displayed near primary content tend to have a higher conversion rate, the content insertion module 134 can increase the conversion rates of the creatives inserted the content insertion module 134 on the information resource.

Figure 2A:
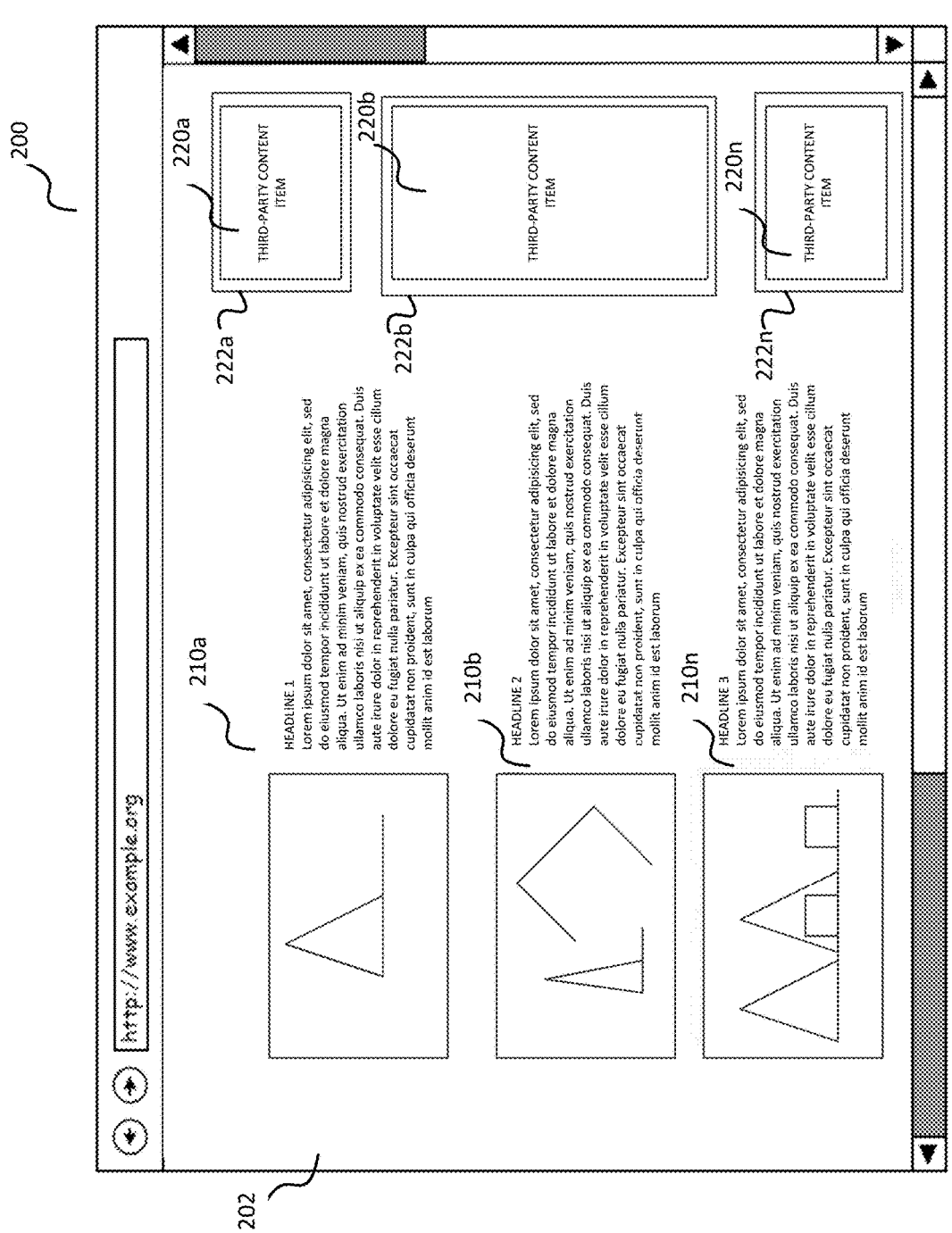
FIG. 2A is a screenshot of a display of an information resource including a plurality of posts.
Figure 2B:
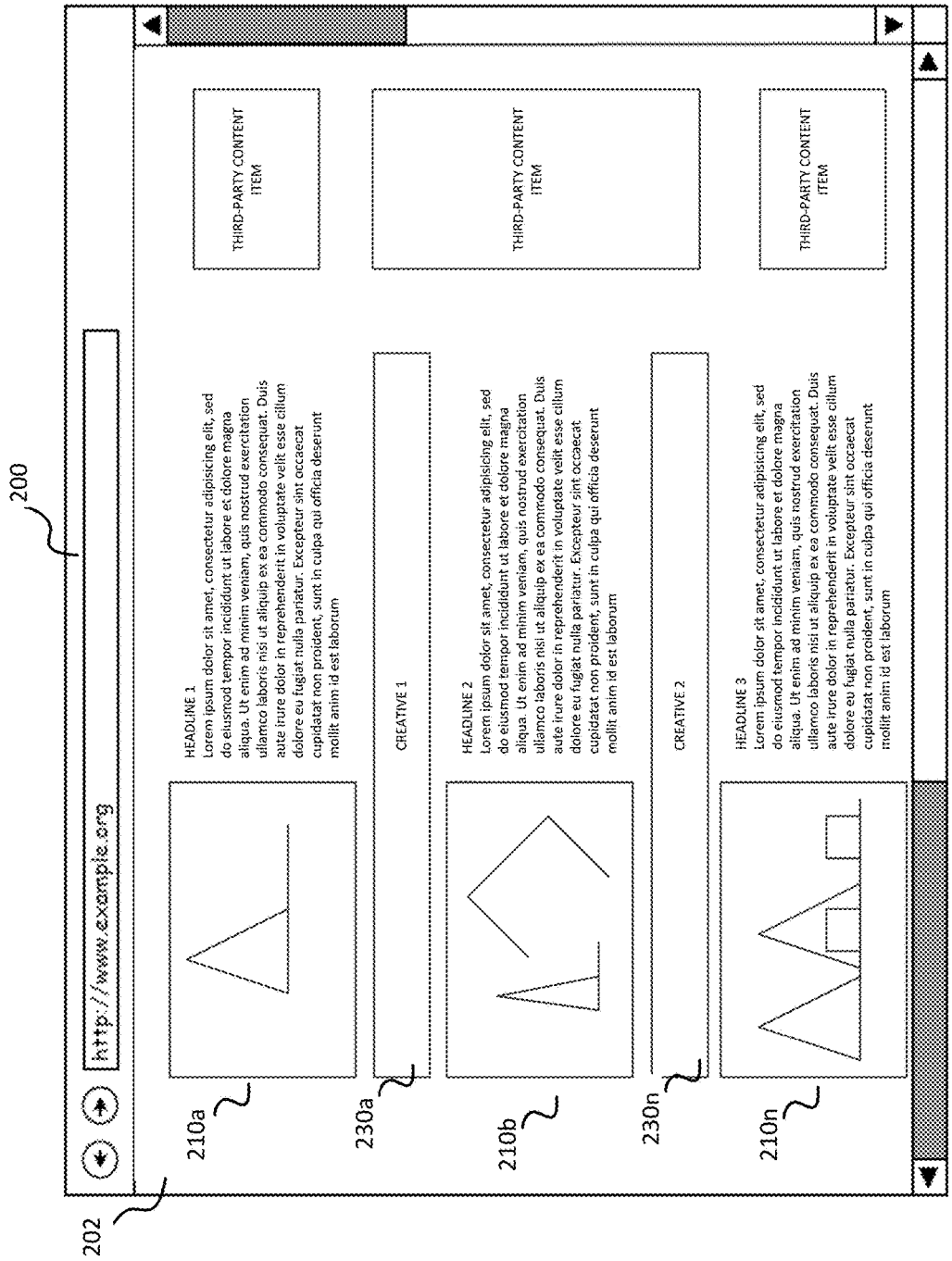
FIG. 2B is a screenshot of a display of the information resource shown in FIG. 2A but including a plurality of creatives inserted between the plurality of posts.

Referring now briefly to FIGS. 2A and 2B, FIG. 2A shows a screenshot 200 of an information resource 202 displayed within a browser window. The information resource 202 includes primary content and third-party content 220a-n. The primary content comprises a plurality of posts 210a-n, each having an associated image, a headline, and corresponding text. The stable identifier generation module 132 described in FIG. 1 can be configured to associate a stable identifier with the DOM tree of the information resource 202 and identify container nodes containing each of the plurality of posts 210a-n. The content insertion module 134 can be configured to use the stable identifier associated with the information resource 202 to insert creatives in between the plurality of posts 210a-n. FIG. 2B shows a screenshot of the information resource shown in FIG. 2A that includes creatives 230a-n between the plurality of posts 210a-n.

In some implementations, the content insertion module 134 can be configured to include a script or other software construct in the DOM tree of the information resource such that when the information resource is rendered on a browser executing on a computing device, the information resource is rendered with creatives inserted in between adjacent posts of the information resource. In some implementations, the browser can execute the script or software construct to identify the container nodes corresponding to the stable identifier, insert creative slots and cause creatives to be retrieved for insertion in the creative slots. In some implementations, the content insertion module 134 can be configured to cause the information resource to render on the browser such that creatives are displayed in slots positioned between adjacent posts or near one or more posts.

Figure 3A:
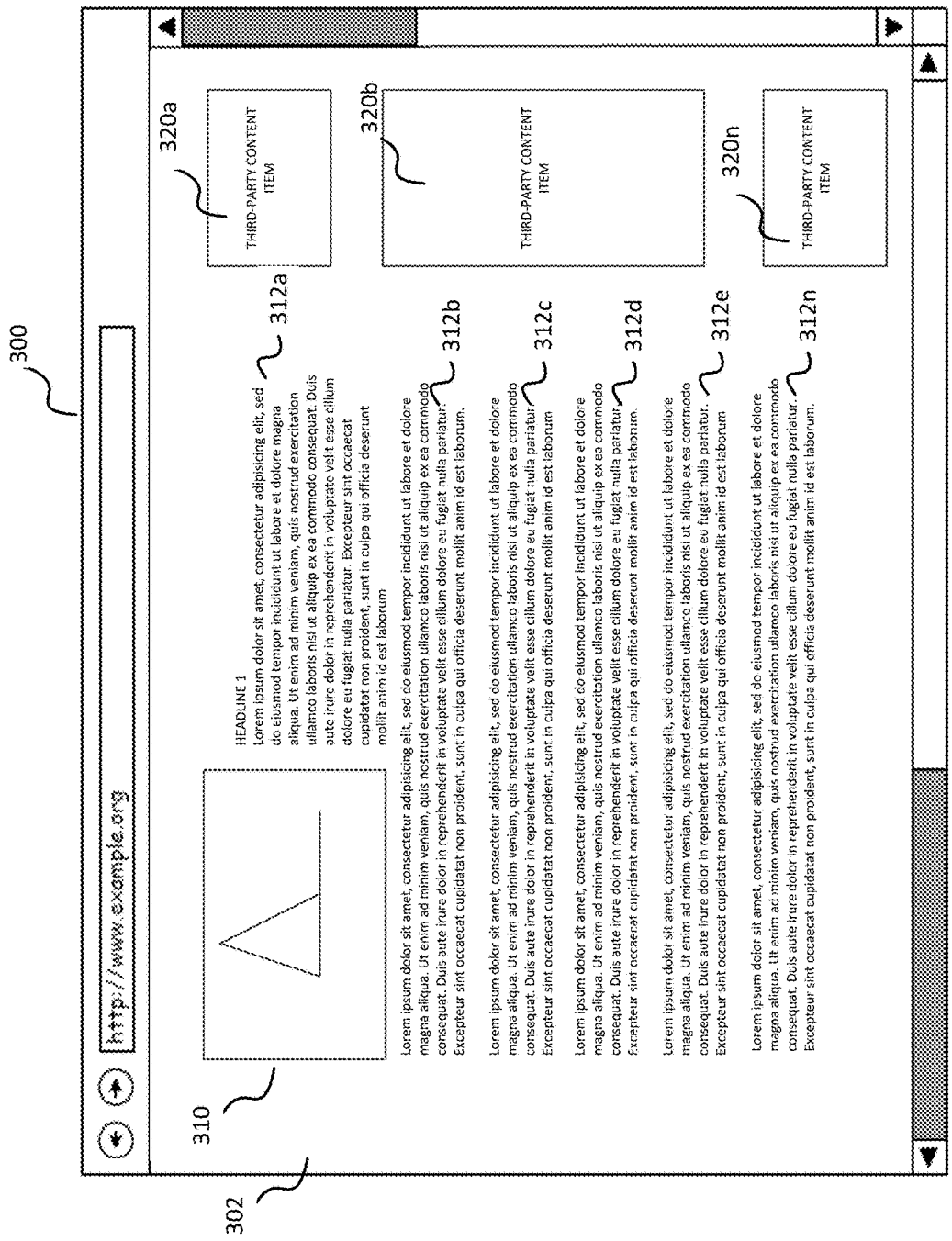
FIG. 3A is a screenshot of a display of an information resource including an article including a plurality of paragraphs.
Figure 3B:
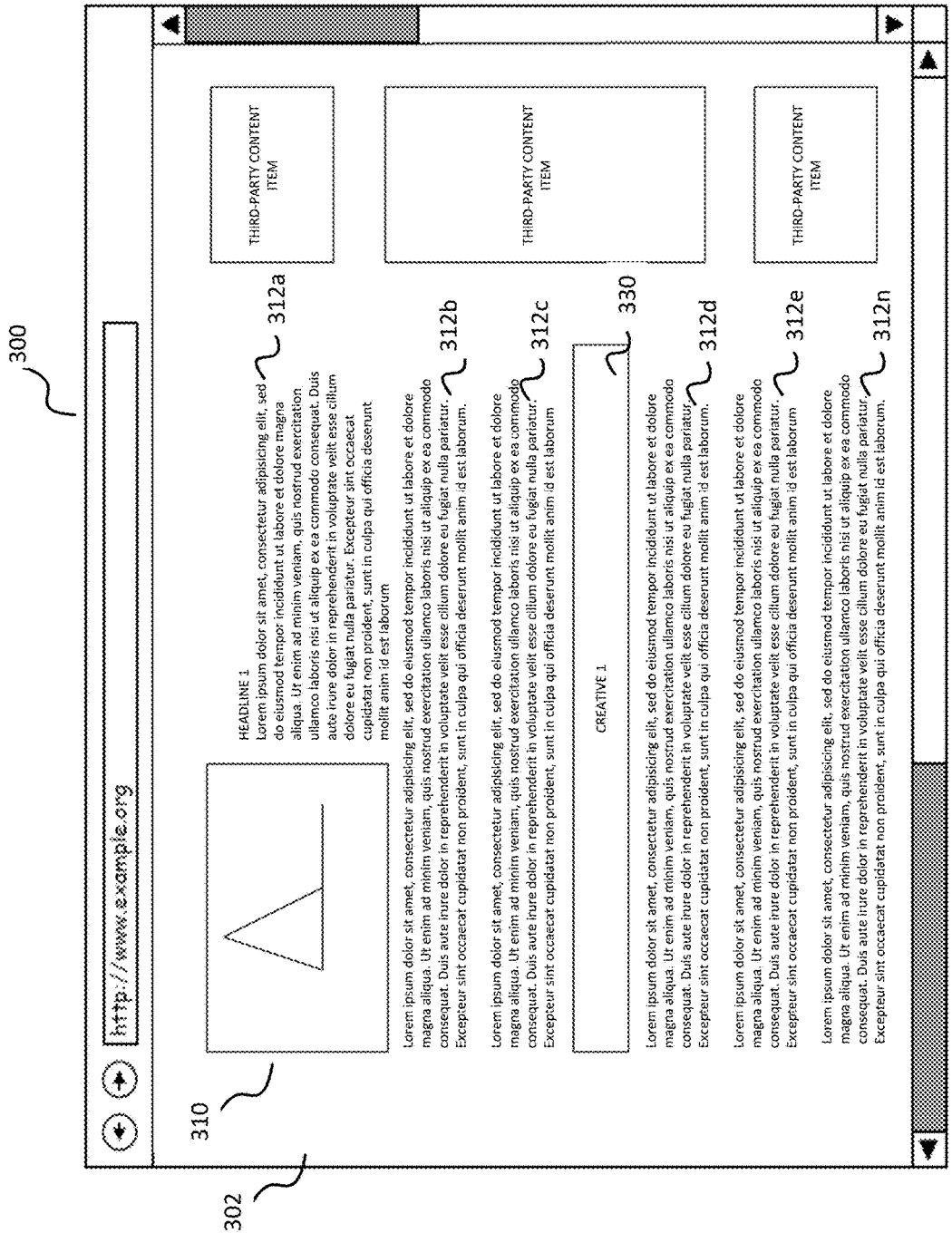
FIG. 3B is a screenshot of a display of the information resource shown in FIG. 3A but including a creative inserted between the plurality of paragraphs.

Referring now briefly to FIGS. 3A and 3B, FIG. 3A shows a screenshot 300 of an information resource 302 displayed within a browser window. The information resource 302 includes primary content and third-party content 320*a-n*. The primary content comprises an article 310 having an associated image, a headline, and corresponding text in multiple paragraphs 312*a*-312*n*. The stable identifier generation module 132 described in FIG. 1 can be configured to associate a stable identifier with the DOM tree of the information resource 302 and identify container nodes containing each of the plurality of paragraphs 312*a-n*. The content insertion module 134 can be configured to use the stable identifier associated with the information resource 302 to insert creatives in between or adjacent to the plurality of paragraphs 312*a-n*. FIG. 3B shows a screenshot of the information resource shown in FIG. 3A that includes a creative 330 between two of the paragraphs 312*a-n*.

In some implementations, the content insertion module 134 can be configured to include a script or other software construct in the DOM tree of the information resource such that when the information resource is rendered on a browser executing on a computing device, the information resource is rendered with creatives inserted in between adjacent paragraphs of an article of the information resource. In some implementations, the browser can execute the script or software construct to identify the container nodes corresponding to the stable identifier, insert creative slots and cause creatives to be retrieved for insertion in the creative slots. In some implementations, the content insertion module 134 can be configured to cause the information resource to render on the browser such that creatives are displayed in slots positioned between adjacent paragraphs or near one or more paragraphs.

The data processing system 110 can also include one or more data stores, such as the database 140. The database can be included in the data processing system 110. In some implementations, the database may be located remote to the data processing system but accessible by the data processing system. The database can store a wide variety of content. For example, the database can store the DOM trees of one or more information resources, lists of container nodes, lists of identifiers associated with the container nodes, maps associating the identifiers with the container nodes, content identification scores of the potential identifiers, as well as the identity of the stable identifier selected to identify the container nodes of the information resource, amongst others. It should be appreciated that the data processing system 110 can include one or more additional modules to provide some or all of the features described herein as well as other additional features.

Figure 4:
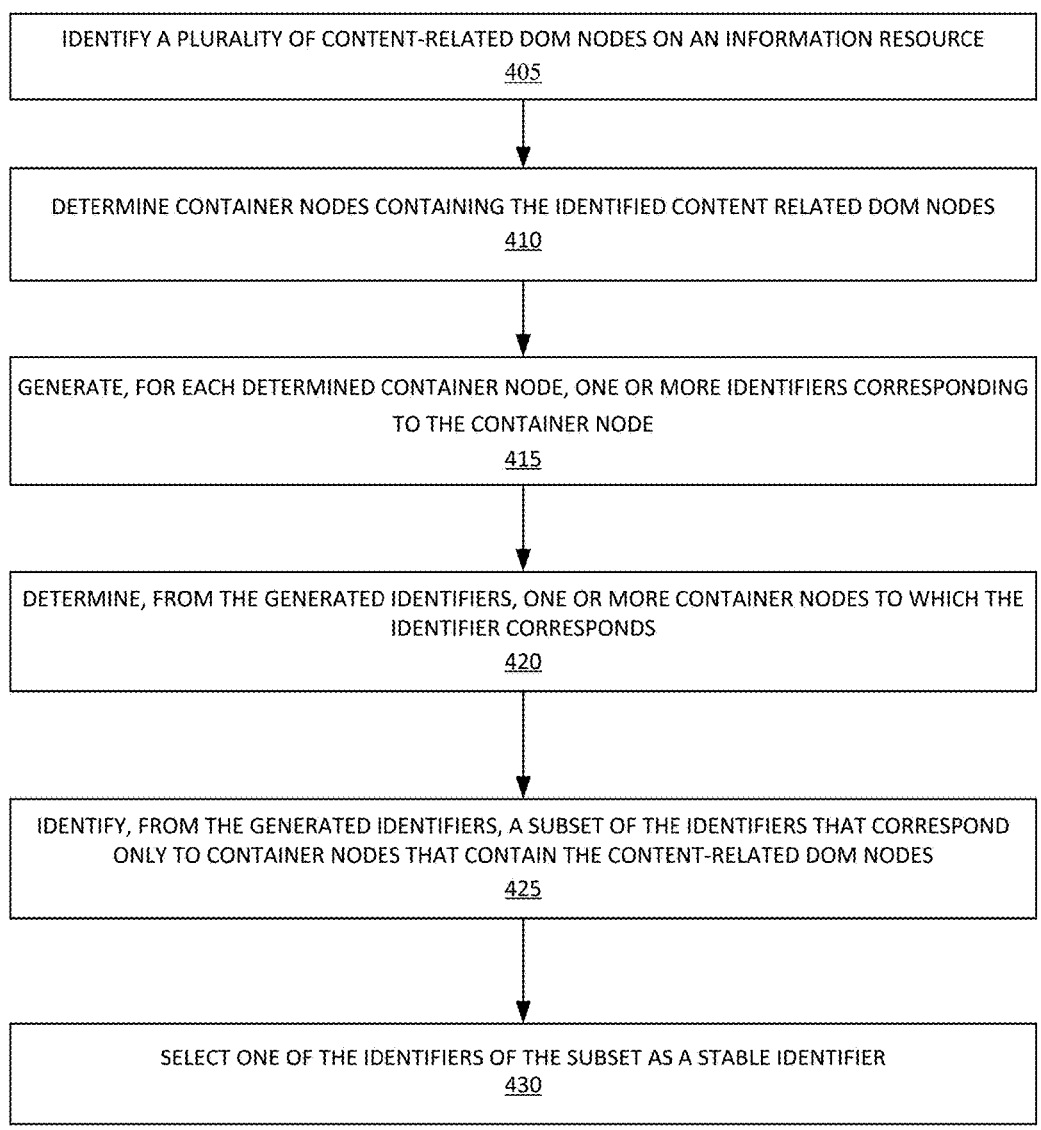
FIG. 4 is a flow diagram depicting one implementation of the steps taken to generate a stable identifier for primary content detected within an information resource.

FIG. 4 is a flow diagram depicting one implementation of the steps taken to generate a stable identifier for nodes likely to include primary content of an information resource. In particular, FIG. 4 illustrates a flow diagram depicting a method 400 for generating a stable identifier for nodes likely to include primary content of an information resource is disclosed. A processor identifies, on an information resource, a plurality of content-related Document Object Model (DOM) nodes likely to include primary content (BLOCK 405). The processor determines one or more container nodes containing one or more of the identified content-related DOM nodes (BLOCK 410). The processor generates, for each of the container nodes, one or more identifiers corresponding to the container node (BLOCK 415). The processor determines, for each of the generated identifiers, one or more container nodes to which the identifier corresponds (BLOCK 420). The processor then determines, from the generated identifiers, a subset of the identifiers that correspond only to container nodes that contain the content-related DOM nodes (BLOCK 425). The processor then selects one of the identifiers of the subset as a stable identifier (BLOCK 430).

In further detail, the processor can identify, on an information resource, a plurality of content-related Document Object Model (DOM) nodes likely to include primary content (BLOCK 405). Examples of primary content can include posts, articles, or other content items that the web publisher has provided. In some implementations, the processor can inspect the DOM tree of an information resource and identify all of the content-related Document Object Model (DOM) nodes included in the information resource. In some implementations, the processor can identify each node included within the information resource and determine whether the identified node is a content-related DOM node. In some implementations, the processor can identify a node by inspecting the DOM tree for tags. A tag associated with a node can indicate the type of node.

In some implementations, the processor can determine that a node is a content-related DOM node based on a primary content detection policy including one or more rules. In some implementations, the processor can determine that a node is a content-related DOM node if the node is one or more of an effective text node, not an effective link node, contains more than a predetermined number of characters, no ancestor of the node is a paragraph, and either the node's rendered height is greater than or equal to twice the height of a line of text of the paragraph or the previous effective text node in the DOM tree is a title.

The processor can determine one or more container nodes containing one or more of the identified content-related DOM nodes (BLOCK 410). In some implementations, the processor can determine, for each content-related DOM node, one or more container nodes containing one or more of the identified content-related DOM nodes. In some implementations, a node of the DOM tree may be identified as a container node if the node meets two criteria. The first criteria is that either the node corresponds to an ARTICLE or the node corresponds to one of a DIV, INS or TD and the node has at least one stable class name. In some implementations, a class name may be considered stable if the class name does not end in a number. In some implementations, a class name is considered to be stable if it does not match the following regular expression: /^.*[09]+$/. The second criteria is that the node either starts with a title or the node is a member of a Cascading Style Sheet (CSS) class that indicates that that the node includes primary content, such as a post. Examples of CSS class types that indicate that the node is a post can include 'post' or 'typepost.'

In some implementations, the processor can determine, for each of the identified content-related DOM nodes, the container node nearest to the content-related DOM node. In some implementations, the container node nearest to a given content-related DOM node can be the container node that contains the content-related DOM node and no other container nodes that also contain the content-related DOM node. In some implementations, the processor can store a record of each identified content-related DOM node and the identity of the nearest container node that contained the identified content-related DOM node.

In some implementations, the processor can determine any equivalent container node for each container node determined to contain one or more of the identified content-related DOM nodes. In some implementations, a node can be considered to be an equivalent container ancestor node if exactly one of the node's descendants is a container node, the DOM node contains exactly the same set of effective text nodes as the descendent container node and the node meets the two criteria for determining that a node is a container node.

In some implementations, the processor can maintain a list of container nodes. The primary content detection module can include each of the container nodes determined for each of the content-related DOM nodes in the list. In some implementations, the processor can also include each of the equivalent container ancestor nodes determined for each container node. In some implementations, the processor can remove any duplicate nodes from the list such that the list of container nodes includes each of the determined container nodes and any equivalent container ancestor nodes corresponding to the determined container nodes.

The processor can generate, for each of the container nodes, one or more identifiers corresponding to the container node (BLOCK 415). In some implementations, the processor can generate, for each of the container nodes included in the list of container nodes, one or more identifiers corresponding to the container node. In some implementations, the stable identifier generation module can be configured to generate, for each of the container nodes included in the list, every identifier corresponding to the container node.

In some implementations, the processor can generate an identifier based on the tag associated with the container node for which the processor is generating the identifier. In some implementations, the processor can generate an identifier based on the class name associated with the container node. In some implementations, the processor can generate the identifier according to an identifier generation policy that includes one or more rules. In some implementations, to generate an identifier for a given container node according to the identifier generation policy, the processor identifies the type of tag associated with the container node and a class name associated with the tag. In some implementations, the processor can generate an identifier having only a tag name if the container node corresponds to an ARTICLE tag type. In some implementations, the tag name of the identifier can be ARTICLE. In some implementations, the processor can generate an identifier having a tag name and an ID if the ID is stable. A stable ID can be any ID that does not end in a number In some implementations, the processor can generate an identifier having a tag name and a class name if the container node corresponds to any tag type other than ARTICLE. In some implementations, the identifier can include the tag type and a single stable class name. In some implementations, the stable class name can correspond to a class name that does not end with a number.

In some implementations, the processor can maintain a list of identifiers generated for the container nodes included in the list of container nodes. In some implementations, the processor may remove any duplicates in the list of identifiers generated for the container nodes. In some implementations, the processor can sort the identifiers generated for the container nodes based on a preference policy. In some implementations, the preference policy can include one or more rules for sorting the potential identifiers.

In some implementations, the processor can arrange a plurality of the generated identifiers of the list of identifiers in order of highest preference to lowest preference. The processor can compare two or more identifiers at a time and determine which of the identifiers has a higher preference. In some implementations, the processor can first determine whether any of the two identifiers includes only a tag name. Identifiers with only a tag name are preferred over identifiers having a tag name and an ID or identifiers having a tag name and a class name. As such, if one of the identifiers has only a tag name, that identifier will be ranked higher than the identifier not having only a tag name. If the processor determines that none of the identifiers being compared includes only a tag name, the processor can determine whether any of the two identifiers includes a tag name and an ID. Identifiers having a tag name and an ID are preferred over identifiers having a tag name without an ID. As such, if one of the identifiers has a tag name and an ID, that identifier will be ranked higher than the identifier not having an ID. If the processor determines that none of the identifiers includes a tag name and an ID, the processor determines whether any of the two identifiers includes a tag name and a class name. Identifiers having a tag name and a class name are preferred over identifiers having a tag name without a class name. As such, if one of the identifiers has a tag name and a class name, the processor will rank that identifier higher than the identifier not having a class name. If the processor identifies that both of the identifiers includes a tag name and a class name, the processor can determine which of the identifiers has a more preferred class name. Identifiers having a more preferred class name are preferred over identifiers having a less preferred class name. As such, if one of the identifiers has a tag name and a more preferred class name, the processor will rank that identifier higher than the identifier not having the more preferred class name. In some implementations, the class name 'post-container' is more preferred than the class names 'post' and 'type-post' and the class name 'post' is more preferred than the class name 'type-post.' If the processor identifies that none of the identifiers includes a tag name with a preferred class name, the processor can determine that the identifier with the longer class name is preferred over an identifier with a shorter class name. As such, the identifier having a longer class name will be ranked higher than the identifier having a shorter class name.

The processor determines, for each of the generated identifiers, one or more container nodes to which the identifier corresponds (BLOCK 420). In some implementations, the processor can associate each of the identifiers generated by the processor to the container nodes to determine a subset of identifiers that correspond only to container nodes that contain the content-related DOM nodes. In some implementations, the processor can map each generated identifier to all of the container nodes from which the processor could have possibly generated the identifier. This is because multiple container nodes may have the same tag types or ids or class names, which result in container nodes having the same tag types or ids or class names generating identical identifiers. In some implementations, the identifiers can serve as keys in a map constructed to map the identifiers to each of the container nodes. In some implementations, the processor can perform, for each identifier, a lookup in the DOM tree of the information resource to identify all nodes that can be referenced by the identifier.

The processor can determine, from the generated identifiers, a subset of the identifiers that correspond only to container nodes that contain the content-related DOM nodes (BLOCK 425). In some implementations, the processor can perform, for each identifier, a lookup in the DOM tree of the information resource to identify all nodes that can be referenced by the identifier. In some implementations, nodes that can be referenced by the identifier include nodes that have characteristics (for example, tag type, id, class name) that would cause the processor to generate the identifier based on the characteristics of the node. For each of the identified nodes corresponding to the identifier, the processor can determine that the identified node is either in a list of container nodes maintained by the processor or that the node meets the criteria for being identified as a container node. In response to determining that the identified node is not on the list of container nodes or does not meet the criteria for being identified as a container node, the processor can disregard the identifier as a stable identifier and remove the identifier from the list of identifiers. Conversely, in response to determining that the identified node is either on the list of container nodes or meets the criteria for being identified as a container node, the processor can include the identifier as a potential stable identifier and as such, determine a content identification score for the identifier. The content identification score can indicate how well the identifier identifies posts, articles or other primary content on the information resource.

The processor can select one of the identifiers of the subset as a stable identifier (BLOCK 430). In some implementations, the processor can determine a content identification score for each of the potential identifiers. In some implementations, the processor can determine the content identification score based on a number of contents of the container nodes to which the identifier is associated. In some implementations, the processor can determine the content identification score of each identifier based on a first number of characters in nodes likely to include primary content (for example, paragraph nodes) that are contained the container nodes associated with the identifier and a second number of characters included within the container nodes associated with the identifier. In some implementations, the processor can determine the content identification score of each identifier based on a first number of nodes likely to include primary content that are contained in the container nodes associated with the identifier and a second number of paragraphs included within the information resource. In some implementations, the processor can determine the content identification score of each identifier based on a first number of characters in nodes likely to include primary content that are contained in the container nodes associated with the identifier and a second number of characters included within all nodes likely to include primary content that are included within the information resource.

The processor can identify the identifier having the largest content identification score. The processor can then select the identifier having the highest content identification score as the stable identifier for identifying container nodes that contain nodes that are likely to include primary content. In some implementations, the processor can store the identity of the stable identifier with the information resource. In this way, the processor can identify posts or articles or nodes likely to include primary content using the stable identifier, which can identify the container nodes corresponding to the posts or articles or nodes likely to include primary content. In some implementations, the processor inserts a creative in between adjacent container nodes corresponding to the stable identifier responsive to receiving a request to serve the information resource.

The following is an implementation of a portion of a DOM tree of an information resource. As shown below, some of the nodes are followed by annotations indicating the type of node. For ease of reference, the annotations begin with //.
<div id='postOne' class='content-entry'>//Ancestor Container Node
   <div class='left-align'>// Container Node
   <h2>Post 1 Title</h2>
   <p>Paragraph 1 . . . blaa blaa blaa . . . end.</p>//DOM node likely to contain primary content
   <p>Paragraph 2 . . . blaa blaa blaa . . . end.</p>// DOM node likely to contain primary content
   </div>
</div>
<div id='postTwo' class='content-entry'>// Ancestor Container Node
   <div class='left-align'>// Container Node
   <h2>Post 2 Title</h2>
   <p>Paragraph 1 . . . blaa blaa blaa . . . end.</p>// DOM node likely to contain primary content
   <p>Paragraph 2 . . . blaa blaa blaa . . . end.</p>// DOM node likely to contain primary content
   </div>
</div>
<div class='left-align'>//Other HTML node on information resource
(Not a post)
   <a href='#'>Link 1</a>
   <a href='#'>Link 2</a>
   </div>

Using the DOM tree above, the processor can generate the following identifiers based on the container nodes. The processor can generate the following identifier for the container nodes.
{
   tagName: 'DIV',
   className: 'left-align'
}

By considering ancestor container nodes, the processor can expand the list of identifiers to the following four identifiers:
{
   tagName: 'DIV',
   className: 'left-align'
}
{
   tagName: 'DIV',
   id: 'postOne'
}
{
   tagName: 'DIV',
   id: 'postTwo'
}
{
   tagName: 'DIV',
   className: 'content-entry'
}

The processor would then discard the {tagName: 'DIV', className: 'left-align'} identifier since it is a container node that does not contain a node likely to contain primary content. In particular, the {tagName: 'DIV', className: 'left-align' } identifier references the following container:
<div class='left-align'>
   <a href='#'>Link 1</a>
   <a href='#'>Link 2</a>
</div>.

The processor would then arrange the remaining three identifiers according to a preference order and select the {tagName: 'DIV', className: 'content-entry' } identifier as the stable identifier as this identifier would have the highest score.

B. Method for Selectively Preventing Content Slots on an Information Resource of a Publisher from Displaying Content Items Many information resources, such as web pages, contain content slots for serving third-party content items, such as ads. Content publishers that maintain or manage these information resources typically insert the content slots manually by inlining snippets of code, such as JAVASCRIPT, at various locations within the code of the information resource, such that when the information resource is rendered for display at a computing device, the content slots display third-party content items retrieved from a content serving server along with primary content of the information resource at the computing device. Once the snippet of code of a content slot is inlined in the code of the information resource, the content slot continues to display content items at a location on the information resource defined by the content slot each time the information resource is rendered at a computing device.

To prevent a content slot of the information resource from serving content items, the content publisher may be required to manually remove or otherwise modify the snippet of code corresponding the content slot to prevent the content slot from serving content items. Removing or modifying the content snippets of code corresponding to the content slots requires some level of technical expertise that some content publishers may not have. In a scenario where a content publisher has to remove a plethora of content slots from a large quantity of information resources, manually removing the snippets of code becomes too tedious. This process prohibits the content publisher from running experiments in which only a portion of the visitors of the information resource are provided with the modified information resource that prevents one or more content slots of the information resource from displaying content items, while the remaining visitors are provided with the original information resource. For example, the content publisher may choose to run an experiment in which only 5% of visitors to the information resource are to receive the modified version of the information resource in which one or more content slots of the information resource do not display content items, while the remaining 95% of visitors receive the original version of the information resource in which all of the content slots of the information resource display content items.

Referring again to FIG. 1, some content publishers, such as the content publisher 120, may utilize a content management system 122, which may be a computer application that allows a remote entity to publish, edit and modify one or more information resources, such as web pages, or content items. In some implementations, the content management system 122 may further allow the remote entity to organize, delete, or otherwise maintain one or more information resources via a central interface. In some implementations, the data processing system 110 can be configured to communicate with the content publisher via the content management system 122. In some implementations, the data processing system 110 may be configured to implement a content management system plugin that allows the data processing system 110 to send instructions to the content management system of the content publisher 120. These instructions can include instructions to serve information resources to one or more end user computing devices, such as the end user computing device 125, modify the information resources of the content publisher, among others. In some implementations, the data processing system 110 can send instructions to the content management system 122 to selectively prevent one or more content slots of one or more information resources from displaying content items when the information resources are displayed at end user computing devices 125. In some implementations, the content slot modification module 139 of the data processing system 110 may serve as a content management system plugin. In some implementations, one or more of the other modules of the data processing system 110 may serve as the content management system plugin.

In some implementations, the content management system or the content slot modification module 139 executing on the content management system 122 can include combinations of software and hardware, such as one or more processors configured to execute one or more scripts to receive a request to provide, to a computing device, an electronic document including actionable language and primary content corresponding to an information resource having one or more content slots in which third-party content items are displayed when the information resource is displayed at the computing device, determine, in response to the request, to provide a modified version of the electronic document corresponding to the information resource, identify, responsive to determining to provide the modified version, in the electronic document, the at least one content slot to prevent from displaying third-party content items, modify the electronic document to include a snippet of actionable language in a portion of the electronic document that is executed by the computing device prior to executing actionable language corresponding to the identified at least one content slot, and then transmit the modified electronic document to the computing device, for instance.

In a typical flow of operation, a content publisher can receive a request from an end user computing device to provide an information resource for display on the end user computing device. The request can identify a URL or address uniquely identifying the information resource to provide for display. The content publisher, responsive to the request, can identify the information resource, or an electronic document that corresponds to the information resource and includes actionable language, such as HTML and/or JAVASCRIPT, and provide the electronic document to the end user computing device 125. The end user computing device then executes the electronic document corresponding to the information resource such that the information resource is displayed on the end user computing device. The information resource can include primary content received from the content publisher as well as one or more third-party content items that are retrieved from one or more content providers 115. The electronic document corresponding to the information resource can include actionable language corresponding to one or more content slots. The actionable language, when executed by the end user computing device 125, can cause the end user computing device 125 to transmit a request to the content provider 115 to provide third-party content items for the corresponding content slots of the electronic document. The content provider 115 can then provide third-party content items for the corresponding content slots to the end user computing device 125 in response to the request. The end user computing device 125 then inserts the content items received from the content provider 115 in the corresponding content slots and displays the content items along with the primary content of the information resource. As described above with respect to FIG. 2A, the information resource 200 includes primary content 210a-210n and third-party content items 220a-220n. The third-party content items 220a-220n can be retrieved from the content provider 115 and inserted within content slots 222a-222n, which are then displayed along with the primary content of the information resource.

For various reasons, the data processing system 110 may be interested in selectively preventing one or more content slots of the information resource from displaying content items when the information resource is displayed on the end user computing device. To do so, the data processing system 110 may be configured to communicate with the content management system 122 of the content publisher 120 to cause the content publisher 120 to modify the electronic document corresponding to the information resource such that when the information resource corresponding to the modified electronic document is displayed, one or more content slots of the information resource are prevented from displaying content items. The data processing system 110 may be configured to provide a list of content slots of the information resource to prevent from displaying content items. The content management system 122, in response to receiving instructions from the data processing system 110 via a plugin or other interface through which the data processing system 110 can communicate with the content management system, can insert actionable language in the electronic document corresponding to the information resource that can cause the information resource to be displayed at an end user computing device such that the content slots prevented from displaying content items do not display content items.

In some implementations, content slots can be configured to retrieve content items from an advertising system that selects a third-party content item to provide to the content slot responsive to a request from the content slot. In some implementations, the third-party content item may be selected via an auction. In some implementations, the content slot may be included in the information resource by inserting actionable language. The actionable language can be a snippet of code.

In some implementations, the actionable language can include a client identifier identifying the content publisher (ad client), an ad height identifying a height corresponding to the content slot, an ad width identifying a width corresponding to the content slot, and a content slot identifier identifying the content slot of the information resource. In some implementations, the actionable language can be a JAVASCRIPT file or other script. In some instances, this JAVASCRIPT file may be a show_ads.js file. To prevent such a content slot from displaying a content item when the information resource is displayed at a computing device, the content management system 122 of the content publisher 120 or a data processing system 110 or other entity, can insert a snippet of actionable language that is configured to replace the client identifier identifying the content publisher (the ad client) of the content slot with an undefined identifier. In this way, the content provider or entity configured to select or provide the third-party content item to the content slot can ignore the request to provide the content item because the content publisher associated with the content slot for which the content item was requested is undefined.

In some instances, this JAVASCRIPT file may be an adsbygoogle.js file. To prevent such a content slot from displaying a content item when the information resource is displayed at a computing device, the content management system 122 of the content publisher 120 or a data processing system 110 or other entity, can insert a snippet of actionable language that is configured to define a new function which is configured to get called instead of an original push function identified in the script of the content slot. The new function is configured to determine if a given content slot of the information resource matches a content slot identified as one that should be prevented from displaying a content item, and responsive to determining that the given content slot matches a content slot identified as one that should be prevented from displaying a content item, to remove the element of the content slot from the DOM and not proceed with calling the original push function to receive a content item from a content provider.

Referring again to FIG. 1, as described above with respect to Section A, the primary content detection module 130, the stable identifier generation module 132, the content insertion module 134 and the content slot modification module 139 can include or execute at least one computer program or at least one script. The primary content detection module 130, the stable identifier generation module 132, the content insertion module 134 and the content slot modification module 139 can be separate components, a single component, or part of the data processing system 110. The primary content detection module 130, the stable identifier generation module 132, the content insertion module 134 and the content slot modification module 139 can include combinations of software and hardware, such as one or more processors configured to execute one or more scripts to receive a request to provide, to a computing device, an electronic document including actionable language and primary content corresponding to an information resource having one or more content slots in which third-party content items are displayed when the information resource is displayed at the computing device, determine, in response to the request, to provide a modified version of the electronic document corresponding to the information resource, identify, responsive to determining to provide the modified version, in the electronic document, the at least one content slot to prevent from displaying third-party content items, modify the electronic document to include a snippet of actionable language in a portion of the electronic document that is executed by the computing device prior to executing actionable language corresponding to the identified at least one content slot, and then transmit the modified electronic document to the computing device, for instance.

The content slot modification module 139 can be designed, constructed or configured to receive a request to provide, to a computing device, an electronic document including actionable language and primary content corresponding to an information resource having one or more content slots in which third-party content items are displayed when the information resource is displayed at the computing device. In implementations in which the content slot modification module 139 is executing on the data processing system 110, the content slot modification module 139 may receive an indication of the content management system 122 of the content publisher receiving the request. In some implementations in which the content slot modification module 139 is executing on the content management system 122, the content slot modification module 139 can receive the request from the end user computing device via the network 105. In some implementations, the request is received from an end user computing device. In some implementations, the request is generated by an action taken by a user at an end user computing device 125, for example, clicking on a link on a browser executing on the computing device 125, or visiting a URL of a web page. The content slot modification module 139 can be configured to identify an end user computing device associated with the request. In some implementations, the request can include an identifier identifying the end user computing device. In some implementations, the identifier can be a source IP address or a device identifier unique to the end user computing device 125. The electronic document can include actionable language, for example, scripts, hyper-text markup language, or other language upon which a browser of the computing device can execute. The electronic document can also include primary content that can include images, text, or other audio/video content that can be provided for display on the information resource when the information resource is displayed on the computing device.

The electronic document can also include one or more content slots that are configured to display content items when the information resource is displayed. In some implementations, content slots can be configured to retrieve content items from an advertising system that selects a third-party content item to provide to the content slot responsive to a request from the content slot. In some implementations, the third-party content item may be selected via an auction. In some implementations, the content slot may be included in the information resource by inserting actionable language. The actionable language can be a snippet of code. In some implementations, the actionable language can include a client identifier identifying the content publisher (ad client), an ad height identifying a height corresponding to the content slot, an ad width identifying a width corresponding to the content slot, and a content slot identifier identifying the content slot of the information resource. In some implementations, the actionable language can be a JAVASCRIPT file or other script. In some instances, this JAVASCRIPT file may be a show_ads.js file, which can include the following snippet of code:

```
show_ads.js
<script type="text/JAVASCRIPT"><!-
google_ad_client="capub5439573510495356";
google_ad_slot="9227932824";
google_ad_width=728;
google_ad_height=90;
//-->
</script>
<script type="text/JAVASCRIPT"
src="//pagead2.googlesyndication.com/pagead/show_ads.js">
</script>
```

In some instances, the JAVASCRIPT file may be a adsbygoogle.js file, which can include the following snippet of code:

```
adsbygoogle.js
<script async
src="//pagead2.googlesyndication.com/pagead/js/adsbygoogle.js"><
/script>
<ins class="adsbygoogle"
style="display:inline-block;width:728px;height:90px"
data-ad-client="ca-pub-5439573510495356"
data-ad-slot="9227932824"></ins>
<script>
(adsbygoogle=window.adsbygoogle ||[ ]).push({ });
</script>
```

The content slot modification module 139 can determine to provide a modified version of the electronic document corresponding to the information resource. In some implementations, the content slot modification module 139 can determine to provide a modified version of the electronic document based on the request to provide an electronic document corresponding to the information resource at the computing device. In some implementations, the content slot modification module 139 may be configured to determine whether to provide a modified version of the electronic document or an original version of the electronic document based on one or more policies. In some implementations, the policies can include one or more rules that define what version of the electronic document to provide to the end user computing device associated with the request. In some implementations, the policies may be based on one or more selection criteria associated with one or more characteristics, features, or information associated with the end-user computing device. For instance, the policy may include one or more rules to provide the modified version of the electronic document to end user computing devices associated with a particular geographical location, a particular device type (for example, mobile device, laptop, tablet, etc.), a time of day, among others.

To the extent that the systems discussed here receive or collect personal information about end user computing devices or users associated with the devices, or may make use of personal information, the users may be provided with an opportunity to control whether programs or features that may collect personal information (e.g., information about a user's network, actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server, such as the content management system 122, the content provider 115 or the data processing system 110.

The content slot modification module 139 can identify at least one content slot to prevent from displaying third-party content items when the information resource is displayed at the end user computing device. In some implementations, the content slot modification module 139 can identify, responsive to determining to provide the modified version, in the electronic document, the at least one content slot to prevent from displaying third-party content items.

In some implementations, the content slot modification module 139 can be configured to identify all of the content slots in the electronic document as content slots that should be prevented from displaying third-party content items when the information resource is displayed at the end user computing device. In some implementations, the content slot modification module 139 can be configured to identify only a subset or portion of the content slots in the electronic document as content slots that should be prevented from displaying third-party content items when the information resource is displayed at the end user computing device. In some implementations, the content slot modification module 139 can be configured to identify the content slots to be prevented from displaying content items based on a determination by the data processing system 110. In some implementations, the content slot modification module 139 can be configured to identify the content slots to be prevented from displaying content items based on a list identifying one or more content slots. In some implementations, the list identifying the one or more content slots is received from the data processing system 110. In some implementations, the list identifying the one or more content slots is generated based on a policy for selecting content slots to be prevented from displaying content items. In some implementations, the policy can include one or more rules that indicate that all content slots having a particular size are to be included in the list of content slots to be prevented from displaying content items. In some implementations, the policy can include one or more rules that indicate that all content slots having a particular location or position within the information resource are to be included in the list of content slots to be prevented from displaying content items. For instance, all above-the-fold ads may be included in the list of content slots to be prevented from displaying content items. In another instance, all ads other than above-the-fold ads may be included in the list of content slots to be prevented from displaying content items.

In some implementations, the content slot modification module 139 can invoke the functionality of one or more modules of the data processing system 110, such as the primary content detection module 130, the stable identifier generation module 132 or the content insertion module 134 to determine content slots included in a DOM tree of an electronic document corresponding to the information resource. As described above, the content slot modification module 139 or another module may be configured to inspect a DOM tree of the electronic document to identify one or more content slots. In some implementations, the content slot modification module 139 may be configured to identify content slots using one or more predetermined keywords that may be indicative of a content slot. For instance, the keywords can include "data-ad-slot-," "google_ad_slot," "ad_width," among others. Using the predetermined keywords, the content slot modification module 139 can inspect the electronic document, for instance, line by line, to identify the keywords in the actionable language included in the electronic document.

In some implementations, the content slot modification module 139 can be configured to identify at least one content slot of an information resource to prevent from displaying third-party content items. To do so, the content slot modification module 139 can identify at least one DOM element corresponding to the at least one content slot. In some implementations, the content slot modification module 139 can identify the at least one DOM element by inspecting a DOM tree of the electronic document used to display the information resource at a computing device.

In some implementations, to identify the at least one content slot to prevent from displaying third-party content items, the content slot modification module 139 can identify, by inspecting a DOM tree of the information resource, one or more DOM elements corresponding to the one or more content slots. The content slot modification module 139 can then identify, for each of the identified DOM elements, an identifier associated with the DOM element and determine that the identifier matches an identifier identified in a list of identifiers of content slots selected to be prevented from displaying third-party content items. In some implementations, the list of identifiers of content slots selected to be prevented from displaying third-party content items is generated based on a policy for identifying content items based on one or more of a total number of content slots, a position of the content slots, or a type of content slot.

The data processing system 110 may be configured to provide a list of content slots of the information resource to prevent from displaying content items. In some implementations, the data processing system 110 may provide, to the content management system 122 or the content slot modification module 139 of the content management system 122, one or more rules to identify the list of content slots of the information resource to prevent from displaying content items. For instance, the data processing system 110 can provide a rule identifying all content slots retrieving content items from a particular content provider, or a rule identifying that no more than a predetermined number of content slots can display content items when the information resource is displayed.

In some implementations, the content slot modification module 139 of the content management system 122 may be configured to generate or maintain a list of content slots of the information resource to prevent from displaying content items. The list can be generated responsive to instructions received from the data processing system 110. In some implementations, the list can be maintained by the content management system 122. In some implementations, the list can be specific to a particular end user computing device, to a group of end user computing devices having one or more commonalties, for example, belonging to the same geographic region or the devices being the same device type, among others. In some implementations, the data processing system 110 can provide the content slot modification module 139 a list of end user computing devices and a corresponding list of content slots to prevent from displaying content items. In some implementations, the content slot modification module 139 can generate an array or list of identifiers identifying the content slots to prevent from displaying content items.

The content slot modification module 139 can be configured to modify the electronic document to include a snippet of actionable language in a portion of the electronic document that is executed by the computing device prior to executing actionable language corresponding to the identified at least one content slot. The content slot modification module 139 can insert the snippet of actionable language in a header portion of the electronic document. In some implementations, the content slot modification module 139 can insert the snippet of actionable language in a body portion of the electronic document so long as the snippet of actionable language is executed by the computing device on which the information resource corresponding to the electronic document is displayed prior to executing a corresponding snippet of actionable language corresponding to a content slot identified as one to prevent from displaying a content item. In some implementations, the snippet of actionable language can be JAVASCRIPT.

In some implementations, the snippet of actionable language is configured to override one or more properties of an object corresponding to the identified content slot. In some implementations, the snippet of actionable language is configured to replace a value of a property of the object identifying the content publisher to a content distribution server that selects content items to provide to the content slots of the information resource. In some implementations, the value of the property of the object identifying the content publisher can be replaced with an undefined value.

In some implementations, the request is a first request, the computing device is a first computing device, the modified version of the electronic document is a first modified version of the electronic document, and the snippet of actionable language is a first snippet. The processors can receive a second request to provide, to a second computing device, the electronic document. The processors can determine, in response to the second request, to provide a second modified version of the electronic document corresponding to the information resource. The second modified version includes actionable language that prevents at least one content slot different from the at least one content slot of the first modified version from displaying third-party content items. The processors identify, responsive to determining to provide the second modified version, in the electronic document, the at least one content slot of the second modified version to prevent from displaying third-party content items. The processors modify the electronic document to include a second snippet of actionable language in a portion of the electronic document that is executed by the computing device prior to executing actionable language corresponding to the identified at least one content slot of the second modified version of the electronic document. The processors transmit the second modified electronic document to the second computing device.

In some implementations, the snippet of actionable language can be specific to a particular type of snippet of actionable language or file associated with the content slot. For instance, if the content slot corresponds to a show_ads.js file, a specific snippet of actionable language configured to alter the execution of the show_ads.js file such that the content slot associated with the show_ads.js file is prevented from displaying a content item is inserted. Similarly, if the content slot corresponds to an adsbygoogle.js file, a specific snippet of actionable language configured to alter the execution of the adsbygoogle.js file such that the content slot associated with the adsbygoogle.js file is prevented from displaying a content item is inserted.

With respect to the show_ads.js file, the content management system 122 of the content publisher 120 or a data processing system 110 or other entity, can insert a snippet of actionable language configured to alter the execution of the show_ads.js file such that the content slot associated with the show_ads.js file is prevented from displaying a content item is inserted. In particular, the snippet of actionable language can be configured to replace a client identifier identifying the content publisher (the ad client) of the content slot with an undefined identifier. In this way, the content provider or entity configured to select or provide the third-party content item to the content slot can ignore the request to provide the content item because the content publisher associated with the content slot for which the content item was requested is undefined. The following is portion of the snippet of the actionable language that can be inserted in the electronic document corresponding to the information resource to prevent one or more content slots associated with the show_ads.js file from displaying a content item. Sentences that begin with // provide a description of the actionable language.
// The 'var adSlotsToRemove' defines an array containing content slot identifiers identifying content slots to prevent from displaying content items.
var adSlotsToRemove=['1234567', '9876543'];
// The 'var currentAd' defines a global variable that will hold the window['adsbygoogle'] object that has been set.
var currentAd={
adClient: undefined,
height: undefined,
eids: undefined,
};
// The Object.defineProperty( )method defines a new property directly on an object, or modifies an existing property on an object, and returns the object. The syntax for the Object.defineProperty( ) method is Object.defineProperty (obj, prop, descriptor). The parameter 'obj' is object on which to define the property, the parameter 'prop' is the name of the property to be defined or modified and the parameter 'descriptor' is the descriptor for the property being defined or modified. Below, window is the obj, 'google_ad_client' is the prop, and the descriptor is an accessor descriptor that has a setter-getter pair.
Object.defineProperty(window, 'google_ad_client', {
set: function(client) {
currentAd.adClient=client;
},
get: function( ) {
// arrayContains(list, value) checks to see if the value corresponding to window.google_ad_slot is included in the list 'adSlotsToRemove' and returns a value of undefined if the value corresponding to window.google_ad_slot is included in the list 'adSlotsToRemove'
if (arrayContains(adSlotsToRemove, window.google_ad_slot)) {
return undefined;
}
return currentAd.adClient;
}
});
// The object.define properties can be established to override the window.google_ad_client property so a decision can be made about whether to invalidate the ad request based on the supplied ad slot code.
// The get function can be used to set the ad client to undefined (if removing the ad), which will invalidate the ad request and cause the content distribution server to ignore the request.
Using In some implementations, the object.define properties can be established to override the window.google_ad_height property so that a decision can be made about whether to reserve space for a content item or ad on the information resource. In the get function, by setting the height to zero (if removing the ad), this means that any markup inserted when show_ads.js runs will have a height of zero and thus not be visible to the user.
Object.defineProperty(window, 'google_ad_height', {
set: function(height) {
currentAd.height=height;
},
get: function( ) {
if (arrayContains(adSlotsToRemove, window.google_ad_slot)) {
return 0;
}
return currentAd.height;
}
});

Using the Object.defineProperty( ) method can allow precise addition to or modification of a property on an object. Normal property addition through assignment creates properties which show up during property enumeration, whose values may be changed, and which may be deleted. This method allows these extra details to be changed from their defaults. The property descriptors present in objects come in two main flavors: data descriptors and accessor descriptors. A data descriptor is a property that has a value, which may or may not be writable. An accessor descriptor is a property described by a getter-setter pair of functions. A descriptor must be one of these two flavors; it cannot be both. Both data and accessor descriptors are objects. An accessor descriptor can have a 'get' key, which is a function that serves as a getter for the property, or undefined if there is no getter. The function return can be used as the value of property. The function defaults to undefined. The accessor descriptor can also have a 'set' key, which is a function that serves as a setter for the property, or undefined if there is no setter. The function will receive, as only argument, the new value being assigned to the property. The function also defaults to undefined.

With respect to content slots generated by the adsbygoogle.js file, the content management system 122 of the content publisher 120 or a data processing system 110 or other entity, can insert a snippet of actionable language configured to alter the execution of the adsbygoogle.js file such that the content slot associated with the adsbygoogle.js file is prevented from displaying a content item. To prevent such content slots associated with the adsbygoogle.js file from displaying a content item when the information resource is displayed at a computing device, the content management system 122 of the content publisher 120 or a data processing system 110 or other entity, can insert a snippet of actionable language that is configured to define a new function which is configured to get called instead of an original push function identified in the script of the content slot. The new function is configured to determine if a given content slot of the information resource matches a content slot identified as one that should be prevented from displaying a content item, and responsive to determining that the given content slot matches a content slot identified as one that should be prevented from displaying a content item, to remove the element of the content slot from the DOM and not proceed with calling the original push function to receive a content item from a content provider. The following is portion of the snippet of the actionable language that can be inserted in the electronic document corresponding to the information resource to prevent one or more content slots generated from the adsbygoogle.js file from displaying a content item. Sentences that begin with I/provide a description of the actionable language.

```
// Define an array containing the ad slot codes for ads we want to remove
var adSlotsToRemove=['1234567', '9876543'];
/ Define a global variable that will hold the window['adsbygoogle'] object that has been set
var adsByGoogleObj;
// Define a global variable to hold the original push method to which calls will be intercepted
var originalPushFunction;
// Define a new function which will get called instead of the original push function whenever a call is made to window ['adsbygoogle'].push(..)
function adsByGooglePush(obj) {
// Get all the DOM elements with the class name 'adsbygoogle', which is the class name that the adsbygoogle.js file will use to identify where to insert the content item or ad
var adEls=document.getElementsByClassName('adsbygoogle');
// Each call to window['adsbygoogle'].push(..) will correspond to a content slot DOM element, so the most recent call should correspond to the last content slot DOM element on the page at this point
var lastAd=adEls[adEls.length-1]
;
if (arrayContains(adSlotsToRemove, lastAd.getAttribute('data-ad-slot')))
{
// If the DOM element corresponds to an ad slot code identifying an ad slot to be removed, then the DOM element is removed from the DOM, and a call the original push function is not made.
lastAd.parentNode.removeChild(lastAd);
} else{
// else the DOM element corresponding to the content slot is left in the DOM and a call is made to the original push function with the ad configuration object
originalPushFunction.call(adsByGoogleObj, obj);
}
}
// Object.define property is used to define getters and setters for a property. What this means is that if an attempt is made to set window['adsbygoogle'] (e.g. window['adsbygoogle']=[ ]), then the setter function gets called instead. Similarly if an attempt is made to read window['adsbygoogle'], then the getter function will be called and the returned value is given to the content slot that made the call.
Object.defineProperty(window, 'adsbygoogle', {
set: function(obj) {
if (obj!=adsByGoogleObj) {
adsByGoogleObj=obj;
// When an attempt to set window['adsbygoogle'] is made, the original push function is remembered and the push function on the supplied object is overridden with the "special" adsByGooglePush push function.
originalPushFunction=adsByGoogleObj.push;
adsByGoogleObj.push=adsByGooglePush;
}
},
get: function( ) {
return adsByGoogleObj;
}
})
```

Once the electronic document corresponding to the information resource is modified such that the content slots identified as ones that are prevented from displaying content items by inserting the snippets of actionable language, the modified electronic document is stored. The stored electronic document can be accessed, retrieved, transmitted, further modified, or deleted. In some implementations, the content management system or the data processing system 110 can store the modified electronic document in a database or other data store. In some implementations, the content slot modification module 139 can be configured to modify the electronic document in more than one way, thereby generating multiple modified versions. For instance, one modified version of an electronic document can include a snippet of actionable language that prevents all content slots from displaying content items. In a second modified version of the electronic document, the electronic document can include a snippet of actionable language that prevents only content slots below the fold from displaying content items. In a third modified version of the electronic document, the electronic document can include a snippet of actionable language that prevents content slots of a particular type, for example, skyscraper content slots, from displaying content items. Moreover, each of these modified versions of the electronic document may be transmitted to different computing devices upon request.

The content slot modification module 139 can be configured to transmit a modified version of the electronic document to a computing device, such as the computing device associated with the request to provide an electronic document including actionable language and primary content corresponding to an information resource having one or more content slots in which third-party content items are displayed when the information resource is displayed at the computing device.

In some implementations, the content slot modification module 139 can be configured to determine which version of the electronic document to transmit to an end user computing device. In some implementations, the content slot modification module 139 can be configured to receive a request for an information resource from an end user computing device, determine, from the request, to transmit a modified version of the electronic document, modify the electronic document to prevent one or more content slots from displaying content items, and transmit the modified version of the electronic document to the end user computing device. In some such implementations, the modified version of the electronic document is generated in real-time responsive to receiving the request. In some implementations, the content slot modification module 139 can generate multiple modified versions based on one or more polices and store the modified versions such that responsive to receiving a request from an end user computing device, the content slot modification module 139 can determine which of the modified versions of the electronic document to transmit to the end user computing device. In some implementations, each of the modified versions of the electronic document can be associated with one or more device identifiers or with particular device types or based on one or more characteristics associated with devices. For example, the content slot modification module 139 can transmit a first modified version of the electronic document that prevents one or more content slots configured to display video ads from displaying content items to an end user computing device that is identified as a mobile device, such as a smartphone. This may be beneficial to the mobile device user as receiving video ads on a mobile device may utilize precious bandwidth while also be annoying to view on a mobile device.

In some implementations, the content management system 122 can be configured to transmit the modified version of the electronic document to the end user computing device 125 via the network 105. In some implementations, the content management system 122 can be configured to transmit the modified version of the electronic document to the end user computing device responsive to receiving instructions from the data processing system 110. In some implementations, the content management system 122 can be configured to transmit the modified version of the electronic document to the end user computing device responsive to receiving instructions from the content slot modification module 139.

Figure 5:
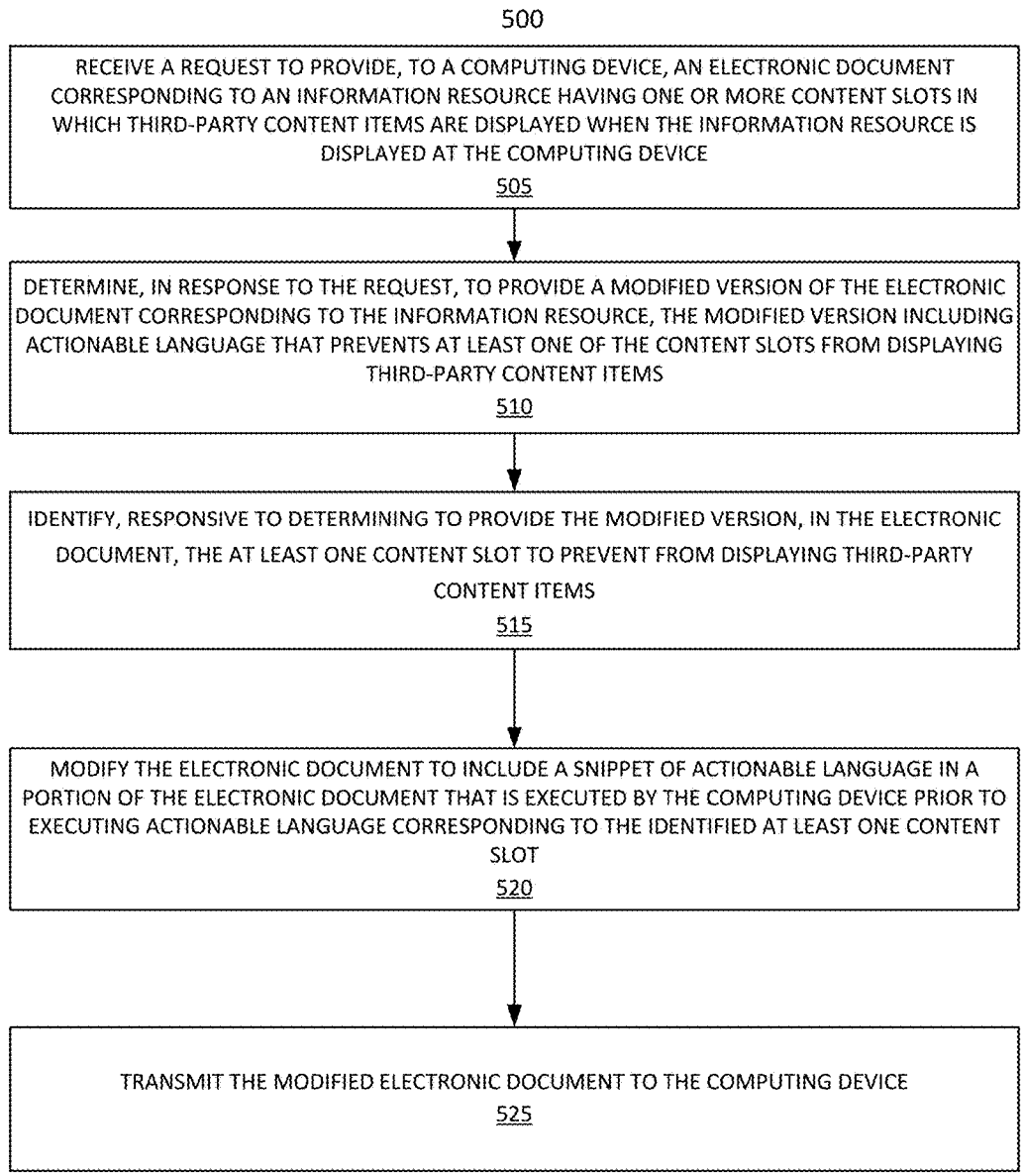
FIG. 5 is a flow diagram depicting one implementation of the steps taken to modify an information resource to selectively prevent content slots from displaying content items on the information resource.

FIG. 5 is a flow diagram depicting one implementation of the steps taken to selectively prevent content slots from displaying content items on an information resource. One or more processors can receive a request to provide, to a computing device, an electronic document including actionable language and primary content corresponding to an information resource having one or more content slots in which third-party content items are displayed when the information resource is displayed at the computing device (BLOCK 505). The processors can determine, in response to the request, to provide a modified version of the electronic document corresponding to the information resource (BLOCK 510). The processors can identify, responsive to determining to provide the modified version, in the electronic document, the at least one content slot to prevent from displaying third-party content items (BLOCK 515). The processors can modify the electronic document to include a snippet of actionable language in a portion of the electronic document that is executed by the computing device prior to executing actionable language corresponding to the identified at least one content slot (BLOCK 520). The processors can then transmit the modified electronic document to the computing device (BLOCK 525).

The processors can receive a request to provide, to a computing device, an electronic document including actionable language and primary content corresponding to an information resource having one or more content slots in which third-party content items are displayed when the information resource is displayed at the computing device (BLOCK 505). The processors can be a part of a data processing system, such as the data processing system 110. In some implementations, the processors can be a part of a content management system, such as the content management system 122. In some implementations, the processors can be a part of a content slot modification module 139 configured to execute within the data processing system 110 or the content management system. In some implementations, the request is received from an end user computing device. In some implementations, the request is generated by an action taken by a user at an end user computing device, for example, clicking on a link on a browser executing on the computing device, or visiting a URL of a web page. The processors can identify an end user computing device associated with the request. In some implementations, the request can include an identifier identifying the end user computing device. In some implementations, the identifier can be a source IP address or a device identifier unique to the end user computing device. In some implementations, the processors can identify characteristics of the end user computing device associated with the request. Examples of characteristics can include a geographic location of the computing device, a type of device, among others. The electronic document can include actionable language, for example, scripts, hyper-text markup language, or other language upon which a browser of the computing device can execute. The electronic document can also include primary content that can include images, text, or other audio/video content that can be provided for display on the information resource when the information resource is displayed on the computing device.

The electronic document can also include one or more content slots that are configured to display content items when the information resource is displayed. In some implementations, content slots can be configured to retrieve content items from an advertising system that selects a third-party content item to provide to the content slot responsive to a request from the content slot. In some implementations, the third-party content item may be selected via an auction. In some implementations, the content slot may be included in the information resource by inserting actionable language. The actionable language can be a snippet of code. In some implementations, the actionable language can include a client identifier identifying the content publisher (ad client), an ad height identifying a height corresponding to the content slot, an ad width identifying a width corresponding to the content slot, and a content slot identifier identifying the content slot of the information resource. In some implementations, the actionable language can be a JAVASCRIPT file or other script. In some instances, this JAVASCRIPT file may be a show_ads.js file. In some other instances, this JAVASCRIPT file may be an adsbygoogle.js file.

The processors can determine, in response to the request, to provide a modified version of the electronic document corresponding to the information resource (BLOCK 510). In some implementations, the processors can determine to provide a modified version of the electronic document based on the request to provide an electronic document corresponding to the information resource at the computing device. In some implementations, the processors can determine whether to provide a modified version of the electronic document or an original version of the electronic document based on one or more policies. In some implementations, the policies can include one or more rules that define what version of the electronic document to provide to the end user computing device associated with the request. In some implementations, the policies may be based on one or more selection criteria associated with one or more characteristics, features, or information associated with the end-user computing device. For instance, the policy may include one or more rules to provide the modified version of the electronic document to end user computing devices associated with a particular geographical location, a particular device type (for example, mobile device, laptop, tablet, etc.), a time of day, among others.

The processors can identify, responsive to determining to provide the modified version, in the electronic document, the at least one content slot to prevent from displaying third-party content items (BLOCK 515). In some implementations, the processors can identify all of the content slots in the electronic document as content slots that should be prevented from displaying third-party content items when the information resource is displayed at the end user computing device. In some implementations, the processors can identify only a subset or portion of the content slots in the electronic document as content slots that should be prevented from displaying third-party content items when the information resource is displayed at the end user computing device. In some implementations, the processors can identify the content slots to be prevented from displaying content items based on a determination by the data processing system. In some implementations, the processors can identify the content slots to be prevented from displaying content items based on a list identifying one or more content slots. In some implementations, the list identifying the one or more content slots is received from the data processing system. In some implementations, the list identifying the one or more content slots can be generated based on a policy for selecting content slots to be prevented from displaying content items. In some implementations, the policy can include one or more rules that indicate that all content slots having a particular size are to be included in the list of content slots to be prevented from displaying content items. In some implementations, the policy can include one or more rules that indicate that all content slots having a particular location or position within the information resource are to be included in the list of content slots to be prevented from displaying content items. For instance, all above-the-fold ads may be included in the list of content slots to be prevented from displaying content items. In another instance, all ads other than above-the-fold ads may be included in the list of content slots to be prevented from displaying content items.

In some implementations, the processors can invoke the functionality of one or more modules of the data processing system to determine content slots included in a DOM tree of an electronic document corresponding to the information resource. As described above, the processors of the data processing system or processors of the content management system executing on servers of the content publisher can inspect a DOM tree of the electronic document to identify one or more content slots. In some implementations, the processors can identify content slots using one or more predetermined keywords that may be indicative of a content slot. For instance, the keywords can include "data-ad-slot-," "google_ad_slot," "ad_width," among others. Using the predetermined keywords, the processors can inspect the electronic document, for instance, line by line, to identify the keywords in the actionable language included in the electronic document.

In some implementations, the processors can be configured to identify at least one content slot of an information resource to prevent from displaying third-party content items. To do so, the processors can identify at least one DOM element corresponding to the at least one content slot. In some implementations, the processors can identify the at least one DOM element by inspecting a DOM tree of the electronic document used to display the information resource at a computing device.

In some implementations, to identify the at least one content slot to prevent from displaying third-party content items, the processors can identify, by inspecting a DOM tree of the information resource, one or more DOM elements corresponding to the one or more content slots. The processors can then identify, for each of the identified DOM elements, an identifier associated with the DOM element and determine that the identifier matches an identifier identified in a list of identifiers of content slots selected to be prevented from displaying third-party content items. In some implementations, the list of identifiers of content slots selected to be prevented from displaying third-party content items is generated based on a policy for identifying content items based on one or more of a total number of content slots, a position of the content slots, or a type of content slot.

In some implementations, the processors of the content management system may receive a list of content slots of the information resource to prevent from displaying content items from the data processing system. In some implementations, the data processing system may provide, to the content management system, one or more rules to identify the list of content slots of the information resource to prevent from displaying content items. For instance, the data processing system can provide a rule identifying all content slots retrieving content items from a particular content provider, or a rule identifying that no more than a predetermined number of content slots can display content items when the information resource is displayed. The processors can then execute the rules to identify the content slots in the electronic document.

In some implementations, the processors can generate or maintain a list of content slots of the information resource to prevent from displaying content items. The list can be generated responsive to instructions received from the data processing system. In some implementations, the list can be maintained by the content management system. In some implementations, the list can be specific to a particular end user computing device, to a group of end user computing devices having one or more commonalities, for example, belonging to the same geographic region or the devices being the same device type, among others. In some implementations, the data processing system can provide the processors a list of end user computing devices and a corresponding list of content slots to prevent from displaying content items. In some implementations, the processors can generate an array or list of identifiers identifying the content slots to prevent from displaying content items.

The processors can modify the electronic document to include a snippet of actionable language in a portion of the electronic document that is executed by the computing device prior to executing actionable language corresponding to the identified at least one content slot (BLOCK 520). In some implementations, the processors can insert the snippet of actionable language in a header portion of the electronic document. In some implementations, the processors can insert the snippet of actionable language in a body portion of the electronic document so long as the snippet of actionable language is executed by the computing device on which the information resource corresponding to the electronic document is displayed prior to executing a corresponding snippet of actionable language corresponding to a content slot identified as one to prevent from displaying a content item. In some implementations, the snippet of actionable language can be JAVASCRIPT.

In some implementations, the snippet of actionable language is configured to override one or more properties of an object corresponding to the identified content slot. In some implementations, the snippet of actionable language is configured to replace a value of a property of the object identifying the content publisher to a content distribution server that selects content items to provide to the content slots of the information resource. In some implementations, the value of the property of the object identifying the content publisher can be replaced with an undefined value.

In some implementations, the snippet of actionable language can be specific to a particular type of snippet of actionable language or file associated with the content slot. For instance, if the content slot corresponds to a show_ads.js file, a specific snippet of actionable language configured to alter the execution of the show_ads.js file such that the content slot associated with the show_ads.js file is prevented from displaying a content item is inserted. Similarly, if the content slot corresponds to an adsbygoogle.js file, a specific snippet of actionable language configured to alter the execution of the adsbygoogle.js file such that the content slot associated with the show_ads.js file is prevented from displaying a content item is inserted.

Once the electronic document corresponding to the information resource is modified such that the content slots identified as ones that are prevented from displaying content items by inserting the snippets of actionable language, the processors can store the modified electronic document. The stored electronic document can be accessed, retrieved, transmitted, further modified, or deleted. In some implementations, the processors can store the modified electronic document in a database or other data store. In some implementations, the processors can modify the electronic document in more than one way, thereby generating multiple modified versions. For instance, one modified version of an electronic document can include a snippet of actionable language that prevents all content slots from displaying content items. In a second modified version of the electronic document, the electronic document can include a snippet of actionable language that prevents only content slots below the fold from displaying content items. In a third modified version of the electronic document, the electronic document can include a snippet of actionable language that prevents content slots of a particular type, for example, skyscraper content slots, from displaying content items. Moreover, each of these modified versions of the electronic document may be transmitted to different computing devices upon request.

The processors can then transmit the modified electronic document to the computing device (BLOCK 525). The processors can transmit a modified version of the electronic document to a computing device, such as the computing device associated with the request to provide an electronic document including actionable language and primary content corresponding to an information resource having one or more content slots in which third-party content items are displayed when the information resource is displayed at the computing device.

In some implementations, the processors can receive a request for an information resource from an end user computing device, determine, from the request, to transmit a modified version of the electronic document, modify the electronic document to prevent one or more content slots from displaying content items, and transmit the modified version of the electronic document to the end user computing device. In some such implementations, the modified version of the electronic document is generated in real-time responsive to receiving the request. In some implementations, the processors can generate multiple modified versions based on one or more polices and store the modified versions such that responsive to receiving a request from an end user computing device, the processors can determine which of the modified versions of the electronic document to transmit to the end user computing device. In some implementations, each of the modified versions of the electronic document can be associated with one or more device identifiers or with particular device types or based on one or more characteristics associated with devices. For example, the processors can transmit a first modified version of the electronic document that prevents one or more content slots configured to display video ads from displaying content items to an end user computing device that is identified as a mobile device, such as a smartphone. This may be beneficial to the mobile device user as receiving video ads on a mobile device may utilize precious bandwidth while also be annoying to view on a mobile device.

In some implementations, the processors can receive a second request to provide the electronic document to a second computing device different from the computing device associated with the request in BLOCK 605. The processors can determine to provide a second modified version of the electronic document corresponding to the information resource in response to the second request. The second modified version includes actionable language that prevents at least one content slot different from the at least one content slot of the modified version corresponding to BLOCK 620 from displaying third-party content items. The processors can identify in the electronic document, responsive to determining to provide the second modified version, the at least one content slot of the second modified version to prevent from displaying third-party content items. The processors can then modify the electronic document to include a second snippet of actionable language in a portion of the electronic document that is executed by the computing device prior to executing actionable language corresponding to the identified at least one content slot of the second modified version of the electronic document. The processors transmit the second modified electronic document to the second computing device.

Once the electronic document modified to selectively prevent content slots from displaying content items on the information resource is transmitted to the end user computing device, one or more processors of the end user computing device can be configured to execute the actionable language contained in the electronic document to display the information resource to which the electronic document corresponds. A browser of the end user computing device can be configured to display the information resource based on the actionable language contained in the electronic document.

Figure 6:
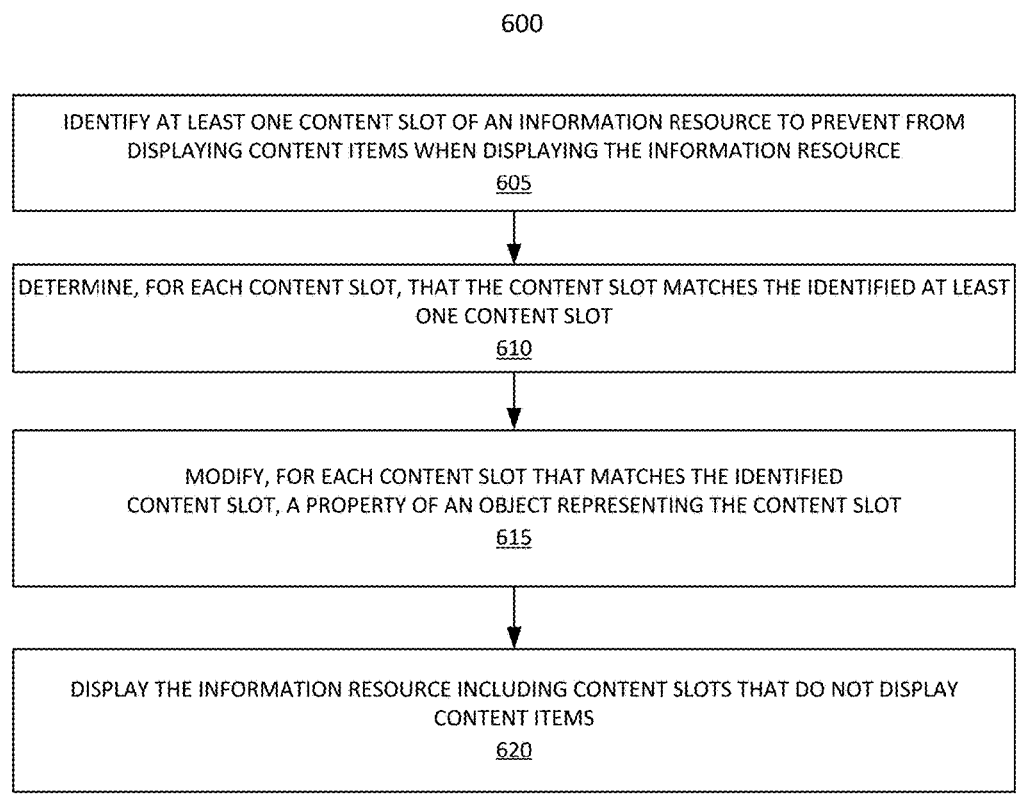
FIG. 6 is a flow diagram depicting one implementation of the steps taken to display the information resource modified to selectively prevent content slots from displaying content items on the information resource.

FIG. 6 is a flow diagram depicting one implementation of the steps taken to display the information resource modified to selectively prevent content slots from displaying content items on the information resource. One or more processors can identify at least one content slot of an information resource to prevent from displaying content items when displaying the information resource (BLOCK 605). The processors can determine, for each of one or more content slots, that the content slot matches the identified at least one content slot (BLOCK 610). The processors can modify, for each content slot that matches the identified at least one content slot, a property of an object representing the content slot (BLOCK 615). The processors can then display the information resource including content slots that do not display content items (BLOCK 620).

The processors can identify at least one content slot of an information resource to prevent from displaying content items when displaying the information resource (BLOCK 605). The processors can be processors of the end user computing device to which the modified electronic document is transmitted to for display. The processors can execute the actionable language included in the electronic document. In some implementations, the processors can execute the actionable language contained in the header portion of the electronic document prior to executing the actionable language in the body of the electronic document. In some implementations, the processors can execute the actionable language one command at a time, starting from the beginning or top of the electronic document and working down. In some implementations, the modified version of the electronic document includes a script or snippet of code that overrides one or more functions of the snippet of code that is used to define the content slots to be prevented from displaying content items.

In some implementations, the processors can identify at least one content slot of an information resource to prevent from displaying content items when displaying the information resource by receiving a list of content slot identifiers. In some implementations, the electronic document can include the list of content slot identifiers corresponding to content slots to prevent from displaying content items when displaying the information resource.

The processors can determine, for each of one or more content slots included in the electronic document, that the content slot matches the identified at least one content slot (BLOCK 6'0). In some implementations, the content slots can correspond to a snippet of code. In some implementations, the content slots can be associated with content slot identifiers that are used to determine if a content slot matches one of the content slots included in the list of content slots to be prevented from displaying content items when displaying the information resource.

The processors can modify, for each content slot that matches the identified at least one content slot, a property of an object representing the content slot (BLOCK 6'5). In some implementations, the processors can modify an identifier associated with the content publisher to a value that the content provider or ad server configured to serve content items to the content slot cannot recognize. In this way, the content provider or ad server will be unable to identify the content publisher and thereby be unable to process the request to serve a content item to the content slot.

The processors can then display the information resource including content slots that do not display content items (BLOCK 620). In some implementations, the processors can display portions of the information resource as the snippets of code corresponding to the portions are executed. In some implementations, the processors may display primary content of the information resource and content items not prevented from displaying content items. In some implementations, the content slots that are prevented from displaying content items may occupy a portion of the information resource by showing whitespace. In some implementations, the content slots that are prevented from displaying content items may be caused to reduce the height of the content slot such that the content slot does not occupy a portion of the information resource.

It should be appreciated that although a portion of the disclosure relates to preventing content slots based on show_ads.js and adssbygoogle.js files from displaying content items, one having ordinary skill in the art can apply the teachings provided herein to apply to content slots based on different formats.

Figure 7:
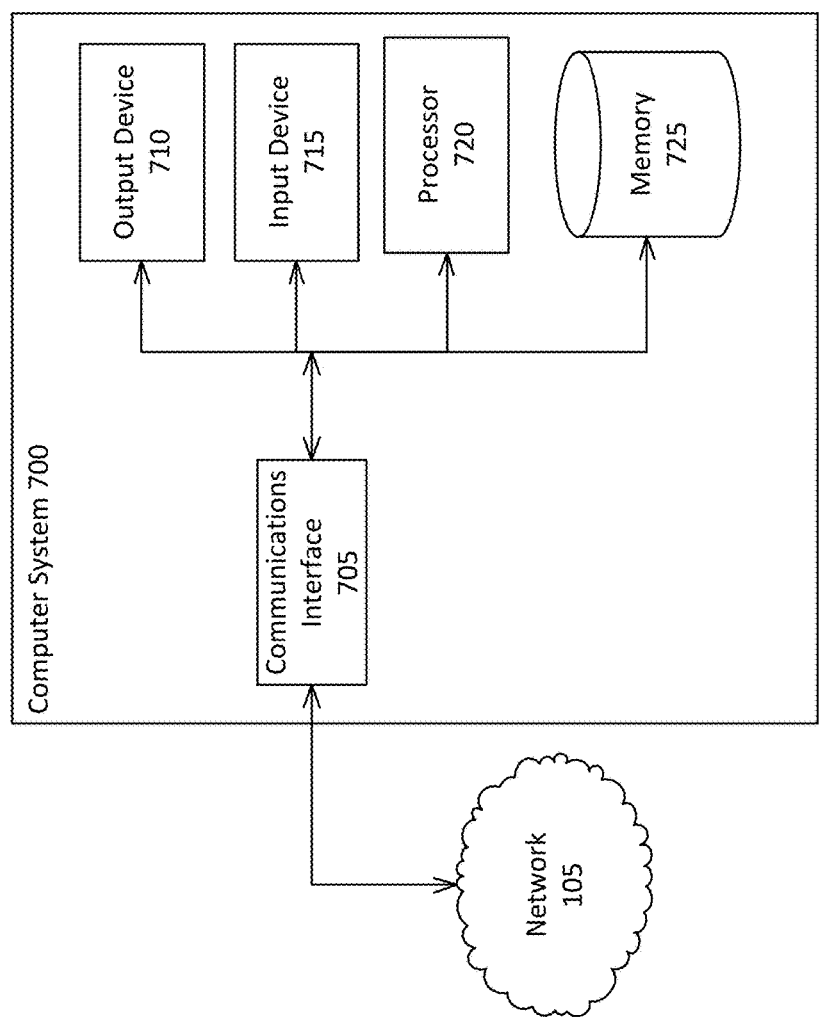
FIG. 7 is a block diagram illustrating an implementation of a general architecture for a computer system that may be employed to implement various elements of the systems and methods described and illustrated herein.

FIG. 7 shows the general architecture of an illustrative computer system 700 that may be employed to implement any of the computer systems discussed herein (including the system 100 and its components such as the primary content detection module 130, the stable identifier generation module 132, the content insertion module 134, and the content slot modification module 139) in accordance with some implementations. The computer system 700 can be used to provide information via the network 105 for display. The computer system 700 of FIG. 7 comprises one or more processors 720 communicatively coupled to memory 725, one or more communications interfaces 705, and one or more output devices 710 (e.g., one or more display units) and one or more input devices 715. The processors 720 can be included in the data processing system 110 or the other components of the system 100 such as the primary content detection module 130, the stable identifier generation module 132, the content insertion module 134, and the content slot modification module 139.

In the computer system 700 of FIG. 7, the memory 725 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 725 to store information related to identifying primary content on an information resource, one or more stable identifiers, one or more styles of properties of DOM elements of primary content of an information resource and one or more native content items served for display. The memory 725 can include the database 140. The processor(s) 720 shown in FIG. 7 may be used to execute instructions stored in the memory 725 and, in so doing, also may read from or write to the memory various information processed and or generated pursuant to execution of the instructions.

The processor 720 of the computer system 700 shown in FIG. 7 also may be communicatively coupled to or control the communications interface(s) 705 to transmit or receive various information pursuant to execution of instructions. For example, the communications interface(s) 705 may be coupled to a wired or wireless network, bus, or other communication means and may therefore allow the computer system 700 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 700. Examples of communications interfaces 705 include user interfaces (e.g., web pages), through which the user can communicate with the data processing system 110.

The output devices 710 of the computer system 700 shown in FIG. 7 may be provided, for example, to allow various information to be viewed or otherwise perceived in connection with execution of the instructions. The input device(s) 715 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The primary content detection module 130, the stable identifier generation module 132, the content insertion module 134 and the content slot modification module 139 can include or share one or more data processing apparatus, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 700 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the primary content detection module 130, the stable identifier generation module 132, the content insertion module 134 and the content slot modification module 139 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations.

References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any information resource. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
    receiving, by one or more processors, a request to provide to a first client device an information resource having a plurality of content slots in which third-party content items are displayed when the information resource is displayed at the first client device, the plurality of content slots located at different locations of the information resource;
    determining that the first client device is to receive a modified version of the information resource;
    responsive to determining that the first client device is to receive a modified version of the information resource, identifying, among the plurality of content slots, a first content slot to be prevented from displaying a third-party content item based at least in part on (i) a total number of the plurality of content slots of the information resource, (ii) a location of the first content slot within the information resource, and (iii) a size of the first content slot, the first content slot associated with a first executable code to be executed by the first client device, wherein the first executable code includes a client identifier identifying a content publisher;
    obtaining, by the one or more processors, a second executable code to be executed by the first client device, the second executable code configured to replace, in the first executable code, the client identifier with an undefined identifier that does not identify a content publisher, execution of the first executable code with the client identifier replaced with the undefined identifier causing a content distribution server to ignore a request for content for the first content slot from the first client device;
    inserting the second executable code, by the one or more processors, at a portion of the information resource that is executed by the first client device prior to executing the first executable code associated with the first content slot, execution of the second executable code prior to execution of the first executable code associated with the first content slot preventing the third-party content item from being displayed in the first content slot, and the inserting the second executable code resulting in the modified version of the information resource;
    transmitting, to the first client device, the modified version of the information resource including the first executable code and the second executable code for execution by the first client device;
    receiving, by the one or more processors, a second request to provide to a second client device the information resource having the plurality of content slots;
    determining that the second client device is to receive an original version of the information resource; and
    responsive to determining that the second client device is to receive an original version of the information resource, transmitting, to the second client device, the original version of the information resource including the first executable code for execution by the second client device.

2. The method of claim 1, wherein at least one of the plurality of content slots of the information resource displayed at the first client device does not display any third-party content item, and wherein each of the plurality of content slots of the information resource displayed at the second client device displays a respective third-party content item.

3. The method of claim 1, wherein inserting the second executable code at a portion of the information resource includes inserting the second executable code at a location in a header portion of the information resource.

4. The method of claim 1, wherein identifying the first content slot to be prevented from displaying the third-party content item includes:
    identifying, by inspecting a DOM tree of the information resource, a DOM element corresponding to the first content slot.

5. The method of claim 1, wherein identifying the first content slot to be prevented from displaying the third-party content item includes:
    identifying, by inspecting a DOM tree of the information resource, a plurality of DOM elements corresponding to the plurality of content slots;
    identifying, for each of the identified DOM elements, an identifier associated with the DOM element; and
    determining that the identifier matches an identifier identified in a list of identifiers of content slots selected to be prevented from displaying third-party content items.

6. The method of claim 5, wherein the list of identifiers of content slots selected to be prevented from displaying third-party content items is generated based on a policy for identifying content items based on at least one of the total number of the content slots, locations of the content slots, sizes of the content slots, or types of the content slots.

7. The method of claim 1, further comprising:
    receiving, by the one or more processors, a third request to provide the information resource to a third client device;

identifying a second content slot of the plurality of content slots to be prevented from displaying a third-party content item, wherein the second content slot is different from the first content slot and is associated with a third executable code;

inserting a fourth executable code at a portion of the information resource such that the fourth executable code is executed by the third client device prior to the third executable code being executed, execution of the fourth executable code preventing the third-party content item from being displayed in the second content slot, and the inserting the fourth executable code resulting in a second modified version of the information resource; and transmitting the second modified version of the information resource to the third client device.

8. A system comprising a data processing system including one or more processors configured to:

receive a request to provide to a first client device an information resource having a plurality of content slots in which third-party content items are displayed when the information resource is displayed at the first client device, the plurality of content slots located at different locations of the information resource;

determine that the first client device is to receive a modified version of the information resource;

responsive to determining that the first client device is to receive a modified version of the information resource, identify, among the plurality of content slots, a first content slot to be prevented from displaying a third-party content item based at least in part on (i) a total number of the plurality of content slots of the information resource, (ii) a location of the first content slot within the information resource, and (iii) a size of the first content slot, the first content slot associated with a first executable code to be executed by the first client device, wherein the first executable code includes a client identifier identifying a content publisher;

obtain a second executable code to be executed by the first client device, the second executable code configured to replace, in the first executable code, the client identifier with an undefined identifier that does not identify a content publisher, execution of the first executable code with the client identifier replaced with the undefined identifier causing a content distribution server to ignore a request for content for the first content slot from the first client device;

inserting the second executable code at a portion of the information resource that is executed by the first client device prior to executing the first executable code associated with the first content slot, execution of the second executable code prior to execution of the first executable code associated with the first content slot preventing the third-party content item from being displayed in the first content slot, and the inserting the second executable code resulting in the modified version of the information resource;

transmit, to the first client device, the modified version of the information resource including the first executable code and the second executable code for execution by the first client device;

receive a second request to provide to a second client device the information resource having the plurality of content slots;

determine that the second client device is to receive an original version of the information resource; and responsive to determining that the second client device is to receive an original version of the information resource, transmit, to the second client device, the original version of the information resource including the first executable code for execution by the second client device.

9. The system of claim 8, wherein at least one of the plurality of content slots of the information resource displayed at the first client device does not display any third-party content item, and wherein each of the plurality of content slots of the information resource displayed at the second client device displays a respective third-party content item.

10. The system of claim 8, wherein inserting the second executable code at a portion of the information resource further comprises the one or more processors configured to insert the second executable code at a location in a header portion of the information resource.

11. The system of claim 8, wherein identifying the first content slot to be prevented from displaying the third-party content item further comprises the one or more processors configured to identify, by inspecting a DOM tree of the information resource, a DOM element corresponding to the first content slot.

12. The system of claim 8, wherein identifying the first content slot to be prevented from displaying the third-party content item further comprises the one or more processors configured to:

identify, by inspecting a DOM tree of the information resource, a plurality of DOM elements corresponding to the plurality of content slots;

identify, for each of the identified DOM elements, an identifier associated with the DOM element; and determine that the identifier matches an identifier identified in a list of identifiers of content slots selected to be prevented from displaying third-party content items.

13. The system of claim 12, wherein the list of identifiers of content slots selected to be prevented from displaying third-party content items is generated based on a policy for identifying content items based on at least one of the total number of the content slots, locations of the content slots, sizes of the content slots, or types of the content slots.

14. The system of claim 8, wherein the one or more processors are further configured to:

receive a third request to provide the information resource to a third client device;

identify a second content slot of the plurality of content slots to be prevented from displaying a third-party content item, wherein the second content slot is different from the first content slot and is associated with a third executable code;

inserting a fourth executable code at a portion of the information resource such that the fourth executable code is executed by the third client device prior to the third executable code being executed, execution of the fourth executable code preventing the third-party content item from being displayed in the second content slot, and the inserting the fourth executable code resulting in a second modified version of the information resource; and transmit the second modified version of the information resource to the third computing client device.

15. A method comprising:

transmitting, by a client device comprising one or more processors, a request for an information resource having a plurality of content slots in which third-party content items are displayed when the information resource is displayed at the client device, the plurality of content slots located at different locations of the information resource;

receiving, by the client device, a modified version of the information resource, wherein a first content slot among the plurality of content slots of the modified version of the information resource is identified as a content slot to be prevented from displaying a third-party content item based at least in part on (i) a total number of the plurality of content slots of the information resource, (ii) a location of the first content slot within the information resource, and (iii) a size of the first content slot, the first content slot associated with a first executable code to be executed by the first client device, and the first executable code including a client identifier identifying a content publisher;

executing, by the client device, prior to executing the first executable code associated with the first content slot, a second executable code configured to replace, in the first executable code, the client identifier with an undefined identifier that does not identify a content publisher, wherein the second executable code is inserted at a portion of the information resource that is executed prior to executing the first executable code associated with the first content slot;

executing, by the client device, after executing the second executable code, the first executable code associated with the first content slot, execution of the first executable code with the client identifier replaced with the undefined identifier causing a content distribution server to ignore a request for content for the first content slot from the client device; and displaying, by the client device, third-party content items in the plurality of content slots other than the first content slot.

16. The method of claim 15, wherein the second executable code is inserted at a location in a header portion of the information resource.

17. The method of claim 15, wherein the first content slot is identified by a server as a content slot to be prevented from displaying a third-party content item by identifying a DOM element corresponding to the first content slot by inspecting a DOM tree of the information resource.

18. The method of claim 15, wherein the first content slot is identified by a server as a content slot to be prevented from displaying a third-party content item by:
- identifying, by inspecting a DOM tree of the information resource, a plurality of DOM elements corresponding to the plurality of content slots;
- identifying, for each of the identified DOM elements, an identifier associated with the DOM element; and
- determining that the identifier matches an identifier identified in a list of identifiers of content slots selected to be prevented from displaying third-party content items.

* * * * *